United States Patent
Cheng et al.

(10) Patent No.: US 10,834,635 B2
(45) Date of Patent: Nov. 10, 2020

(54) INFORMATION TRANSMISSION METHOD AND APPARATUS

(71) Applicant: HUAWEI TECHNOLOGIES CO., LTD., Shenzhen (CN)

(72) Inventors: Yan Cheng, Beijing (CN); Zheng Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 16/111,232

(22) Filed: Aug. 24, 2018

(65) Prior Publication Data

US 2018/0368024 A1  Dec. 20, 2018

Related U.S. Application Data

(63) Continuation of application No. PCT/CN2016/110177, filed on Dec. 15, 2016.

(30) Foreign Application Priority Data

Feb. 26, 2016  (CN) .......................... 2016 1 0108613

(51) Int. Cl.
*H04B 7/212* (2006.01)
*H04W 28/06* (2009.01)
(Continued)

(52) U.S. Cl.
CPC .......... *H04W 28/065* (2013.01); *H04L 1/0061* (2013.01); *H04L 1/08* (2013.01);
(Continued)

(58) Field of Classification Search
CPC ........... H04W 28/065; H04W 72/0446; H04W 72/0406; H04W 72/0421; H04L 5/0048;
(Continued)

(56) References Cited

U.S. PATENT DOCUMENTS 9,357,541 B2 *  5/2016  Moulsley ............ H04W 72/042
9,674,866 B2 *  6/2017  Li ........................ H04W 28/06
(Continued)

FOREIGN PATENT DOCUMENTS

CN        101567775 A    10/2009
CN        101772179 A     7/2010
(Continued)

*Primary Examiner* — Hanh N Nguyen
(74) *Attorney, Agent, or Firm* — Kilpatrick Townsend & Stockton LLP

(57) ABSTRACT

Embodiments of the present disclosure relate to the field of communications technologies, and provide an information transmission method and apparatus, to flexibly set a quantity of subframes in subframe aggregation and a redundancy version based on a channel condition. The method includes: sending, by a first device, downlink control information to a second device, where the downlink control information includes subframe aggregation information, and the subframe aggregation information is used by the first device to indicate, to the second device, a quantity of subframes used in subframe aggregation and/or a redundancy version corresponding to at least one of subframes used in subframe aggregation; and receiving, by the first device, uplink information sent by the second device according to the downlink control information. The embodiments of the present disclosure are used for subframe aggregation.

12 Claims, 6 Drawing Sheets

(51) Int. Cl.
*H04L 1/18* (2006.01)
*H04L 1/08* (2006.01)
*H04L 1/00* (2006.01)
*H04L 5/00* (2006.01)
*H04L 5/14* (2006.01)
*H04W 72/04* (2009.01)

(52) U.S. Cl.
CPC ............ *H04L 1/189* (2013.01); *H04L 1/1819* (2013.01); *H04L 1/1825* (2013.01); *H04L 1/1858* (2013.01); *H04L 1/1864* (2013.01); *H04L 1/1896* (2013.01); *H04L 5/0048* (2013.01); *H04L 5/0055* (2013.01); *H04L 5/14* (2013.01); *H04W 72/0406* (2013.01); *H04W 72/0446* (2013.01)

(58) Field of Classification Search
CPC ....... H04L 5/0055; H04L 5/14; H04L 1/0061; H04L 5/0032; H04L 5/001
See application file for complete search history.

(56) References Cited

U.S. PATENT DOCUMENTS

| | | | |
|---|---|---|---|
| 9,730,197 B2* | 8/2017 | Awad | H04L 1/0003 |
| 2013/0070690 A1 | 3/2013 | Moon et al. | |
| 2015/0222394 A1* | 8/2015 | Cheng | H04L 1/1854 |
| | | | 370/280 |
| 2015/0237644 A1 | 8/2015 | Golitschek Edler Von Elbwart et al. | |
| 2015/0280876 A1 | 10/2015 | You et al. | |
| 2017/0048886 A1* | 2/2017 | Sun | H04W 72/14 |
| 2017/0164363 A1 | 6/2017 | Zhang et al. | |
| 2017/0290008 A1* | 10/2017 | Tooher | H04L 1/0007 |
| 2018/0123741 A1 | 5/2018 | You et al. | |

FOREIGN PATENT DOCUMENTS

| | | |
|---|---|---|
| CN | 102142885 A | 8/2011 |
| CN | 103249147 A | 8/2013 |
| CN | 104468030 A | 3/2015 |
| CN | 104798329 A | 7/2015 |
| WO | 2015044408 A1 | 4/2015 |

* cited by examiner

INFORMATION TRANSMISSION METHOD AND APPARATUS

CROSS-REFERENCE TO RELATED APPLICATIONS

This application is a continuation of International Application No. PCT/CN2016/110177, filed on Dec. 15, 2016, which claims priority to Chinese Patent Application No. 201610108613.6, filed on Feb. 26, 2016. The disclosures of the aforementioned applications are hereby incorporated by reference in their entireties.

TECHNICAL FIELD

The present disclosure relates to the field of communications technologies, and in particular, to an information transmission method and apparatus.

BACKGROUND

A Long Term Evolution (LTE) system supports a hybrid automatic repeat request (HARQ). To be specific, during transmission, the system generates a set of different coded bits according to information bits of a same transport block, to convert the same transport block into a plurality of different redundancy versions (RV). Each RV has a corresponding sequence number. When a first RV is sent in a subframe, whether a subsequent RV is to be sent depends on whether previous transmission is correct, and to be specific, depends on whether a hybrid automatic repeat request-acknowledgment corresponding to the previous transmission is an ACK (ACK) or a NACK (NACK).

An existing LTE system supports transmission time interval bundling (TTI Bundling) in uplink. A quantity of subframes bound in TTI bundling is four, and corresponding redundancy version numbers are 0, 2, 3, and 1. These subframes form one TTI bundle (TTI Bundle). After all transport blocks are received and combined, all the subframes in the TTI bundle are transmitted as a whole, and a unified HARQ-ACK is to be sent.

Low-latency and highly-reliable services are becoming more important in a future communications system. The TTI bundling in the existing LTE system can reduce a service delay and improve service transmission reliability. However, because a quantity of subframes in TTI bundling in the existing TTI bundling mechanism is fixed at four, and the quantity of subframes in the TTI bundling cannot be flexibly configured based on a channel condition of user equipment, spectrum resource usage efficiency is reduced and spectrum resource consumption is increased.

SUMMARY

This application provides an information transmission method and apparatus, to flexibly set a quantity of subframes in subframe aggregation and a redundancy version based on a channel condition, so as to improve resource utilization; and to flexibly configure a first subframe type and a second subframe type, so that an evolved TDD system can improve system performance by using proper GP overheads.

To achieve the foregoing objective, the following technical solutions are used in this application:

According to a first aspect, an information transmission method is provided, including: sending, by a first device, downlink control information to a second device, where the downlink control information includes subframe aggregation information, and the subframe aggregation information is used by the first device to indicate, to the second device, a quantity of subframes used in subframe aggregation and/or a redundancy version corresponding to at least one of subframes used in subframe aggregation; and receiving, by the first device, uplink information sent by the second device according to the downlink control information.

The downlink control information sent by the first device to the second device includes the subframe aggregation information, so that the second device may obtain, according to the subframe aggregation information, the quantity of the subframes used in the subframe aggregation and/or the redundancy version corresponding to the at least one of the subframes used in the subframe aggregation, and perform corresponding processing. Therefore, the quantity of the subframes used in the subframe aggregation can be dynamically indicated based on a channel condition, so that resources are efficiently used, spectrum utilization is improved, and data transmission reliability can be ensured. Moreover, use of consecutive subframes for transmission can reduce a service delay while ensuring transmission reliability. For a user whose channel condition is favorable, use of fewer subframes for transmission can further reduce the service delay, thereby better serving a low-latency and highly-reliable service.

In a first possible implementation of the first aspect, the downlink control information is used to schedule downlink data transmission, and the uplink information is a hybrid automatic repeat request-acknowledgment corresponding to the downlink data transmission.

In a second possible implementation of the first aspect, the downlink control information is used to schedule uplink data transmission, and the uplink information is uplink data scheduled by using the downlink control information.

With reference to the first aspect or the first possible implementation of the first aspect, in a third possible implementation, the subframe aggregation information corresponds to a redundancy version in the downlink control information, and the subframe aggregation information indicates a redundancy version corresponding to a first subframe in the subframes used in the subframe aggregation.

With reference to the third possible implementation of the first aspect, in a fourth possible implementation, the first device sends radio resource control signaling to the second device, where the radio resource control signaling is used to indicate the quantity of the subframes used in the subframe aggregation.

With reference to the third possible implementation of the first aspect, in a fifth possible implementation, the first device scrambles a cyclic redundancy check CRC of the downlink control information by using a radio network temporary identifier RNTI, where the RNTI indicates the quantity of the subframes used in the subframe aggregation, and different RNTIs correspond to different subframe quantities.

With reference to either of the fourth possible implementation and the fifth possible implementation of the first aspect, in a sixth possible implementation, the first device determines, based on the quantity of the subframes used in the subframe aggregation and the redundancy version corresponding to the first subframe in the subframes used in the subframe aggregation, redundancy versions corresponding to remaining subframes in the subframes used in the subframe aggregation, specifically including: using, as a starting point by the first device, the redundancy version corresponding to the first subframe in the subframes used in the subframe aggregation, and obtaining X redundancy versions in a sequential order of redundancy versions 0, 2, 3, and 1 in a cyclic repetition manner, where X is equal to the quantity of the subframes used in the subframe aggregation, and the X redundancy versions are in a one-to-one correspondence to the subframes used in the subframe aggregation.

With reference to the first aspect or the first possible implementation of the first aspect, in a seventh possible implementation, a subframe aggregation information field in a downlink control information format corresponding to the downlink control information occupies three information bits.

With reference to the seventh possible implementation of the first aspect, in an eighth possible implementation, when a value corresponding to the subframe aggregation information field is 000, the quantity of the subframes used in the subframe aggregation is one, and a redundancy version corresponding to a first subframe in the subframes used in the subframe aggregation is 0;

when a value corresponding to the subframe aggregation information field is 001, the quantity of the subframes used in the subframe aggregation is one, and a redundancy version corresponding to a first subframe in the subframes used in the subframe aggregation is 1;

when a value corresponding to the subframe aggregation information field is 010, the quantity of the subframes used in the subframe aggregation is one, and a redundancy version corresponding to a first subframe in the subframes used in the subframe aggregation is 2;

when a value corresponding to the subframe aggregation information field is 011, the quantity of the subframes used in the subframe aggregation is one, and a redundancy version corresponding to a first subframe in the subframes used in the subframe aggregation is 3;

when a value corresponding to the subframe aggregation information field is 100, the quantity of the subframes used in the subframe aggregation is two, a redundancy version corresponding to a first subframe in the subframes used in the subframe aggregation is 0, and a redundancy version corresponding to a second subframe in the subframes used in the subframe aggregation is 2;

when a value corresponding to the subframe aggregation information field is 101, the quantity of the subframes used in the subframe aggregation is two, a redundancy version corresponding to a first subframe in the subframes used in the subframe aggregation is 3, and a redundancy version corresponding to a second subframe in the subframes used in the subframe aggregation is 1; or when a value corresponding to the subframe aggregation information field is 110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to a third subframe in the subframes used in the subframe aggregation is 3, and a redundancy version corresponding to a fourth subframe in the subframes used in the subframe aggregation is 1.

With reference to the first aspect or the first possible implementation of the first aspect, in a ninth possible implementation, the subframe aggregation information is further used to indicate subframe types of the subframes used in the subframe aggregation, the subframe types include a first subframe type, subframes corresponding to the first subframe type include a time domain symbol used for downlink transmission, a guard period GP, and a time domain symbol used for uplink transmission, and a quantity of time domain symbols used for downlink transmission is greater than or equal to a quantity of time domain symbols used for uplink transmission.

With reference to the ninth possible implementation of the first aspect, in a tenth possible implementation, a subframe aggregation information field in a downlink control information format corresponding to the downlink control information occupies four information bits, and specifically:

when a value corresponding to the subframe aggregation information field is 0000, the quantity of the subframes used in the subframe aggregation is one, a redundancy version corresponding to a first subframe in the subframes used in the subframe aggregation is 0, and a subframe type of the first subframe in the subframes used in the subframe aggregation is downlink subframe;

when a value corresponding to the subframe aggregation information field is 0001, the quantity of the subframes used in the subframe aggregation is one, a redundancy version corresponding to a first subframe in the subframes used in the subframe aggregation is 0, and a subframe type of the first subframe in the subframes used in the subframe aggregation is a first subframe type;

when a value corresponding to the subframe aggregation information field is 0010, the quantity of the subframes used in the subframe aggregation is one, a redundancy version corresponding to a first subframe in the subframes used in the subframe aggregation is 1, and a subframe type of the first subframe in the subframes used in the subframe aggregation is downlink subframe;

when a value corresponding to the subframe aggregation information field is 0011, the quantity of the subframes used in the subframe aggregation is one, a redundancy version corresponding to a first subframe in the subframes used in the subframe aggregation is 1, and a subframe type of the first subframe in the subframes used in the subframe aggregation is a first subframe type;

when a value corresponding to the subframe aggregation information field is 0100, the quantity of the subframes used in the subframe aggregation is one, a redundancy version corresponding to a first subframe in the subframes used in the subframe aggregation is 2, and a subframe type of the first subframe in the subframes used in the subframe aggregation is downlink subframe;

when a value corresponding to the subframe aggregation information field is 0101, the quantity of the subframes used in the subframe aggregation is one, a redundancy version corresponding to a first subframe in the subframes used in the subframe aggregation is 2, and a subframe type of the first subframe in the subframes used in the subframe aggregation is a first subframe type;

when a value corresponding to the subframe aggregation information field is 0110, the quantity of the subframes used in the subframe aggregation is one, a redundancy version corresponding to a first subframe in the subframes used in the subframe aggregation is 3, and a subframe type of the first subframe in the subframes used in the subframe aggregation is downlink subframe;

when a value corresponding to the subframe aggregation information field is 0111, the quantity of the subframes used in the subframe aggregation is one, a redundancy version corresponding to a first subframe in the subframes used in the subframe aggregation is 3, and a subframe type of the first subframe in the subframes used in the subframe aggregation is a first subframe type;

when a value corresponding to the subframe aggregation information field is 1000, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both downlink subframe;

when a value corresponding to the subframe aggregation information field is 1001, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, a subframe type of the first subframe in the subframes used in the subframe aggregation is downlink subframe, and a subframe type of the second subframe in the subframes used in the subframe aggregation is a first subframe type;

when a value corresponding to the subframe aggregation information field is 1010, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both a first subframe type;

when a value corresponding to the subframe aggregation information field is 1011, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both downlink subframe;

when a value corresponding to the subframe aggregation information field is 1100, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, a subframe type of the first subframe in the subframes used in the subframe aggregation is downlink subframe, and a subframe type of the second subframe in the subframes used in the subframe aggregation is a first subframe type;

when a value corresponding to the subframe aggregation information field is 1101, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both a first subframe type;

when a value corresponding to the subframe aggregation information field is 1110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, subframe types of the first subframe, the second subframe, and a third subframe in the subframes used in the subframe aggregation are all downlink subframe, and a subframe type of a fourth subframe in the subframes used in the subframe aggregation is a first subframe type; or when a value corresponding to the subframe aggregation information field is 1111, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, and subframe types of the first subframe, the second subframe, a third subframe, and a fourth subframe in the subframes used in the subframe aggregation are all a first subframe type.

With reference to either of the ninth possible implementation and the tenth possible implementation of the first aspect, in an eleventh possible implementation, the downlink control information includes hybrid automatic repeat request-acknowledgment subframe information, where the hybrid automatic repeat request-acknowledgment subframe information is used to indicate a subframe of the hybrid automatic repeat request-acknowledgment corresponding to the downlink data transmission scheduled by using the downlink control information.

With reference to the first aspect or the second possible implementation of the first aspect, in a twelfth possible implementation, a subframe aggregation information field in a downlink control information format corresponding to the downlink control information occupies two information bits, and specifically:

when a value corresponding to the subframe aggregation information field is 00, the quantity of the subframes used in the subframe aggregation is one, and a redundancy version corresponding to a first subframe in the subframes used in the subframe aggregation is indicated by a modulation and coding scheme and a redundancy version domain in the downlink control information format;

when a value corresponding to the subframe aggregation information field is 01, the quantity of the subframes used in the subframe aggregation is two, a redundancy version corresponding to a first subframe in the subframes used in the subframe aggregation is 0, and a redundancy version corresponding to a second subframe in the subframes used in the subframe aggregation is 2;

when a value corresponding to the subframe aggregation information field is 10, the quantity of the subframes used in the subframe aggregation is two, a redundancy version corresponding to a first subframe in the subframes used in the subframe aggregation is 3, and a redundancy version corresponding to a second subframe in the subframes used in the subframe aggregation is 1; or when a value corresponding to the subframe aggregation information field is 11, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to a third subframe in the subframes used in the subframe aggregation is 3, and a redundancy version corresponding to a fourth subframe in the subframes used in the subframe aggregation is 1.

With reference to the first aspect or the second possible implementation of the first aspect, in a thirteenth possible implementation, the subframe aggregation information is further used to indicate subframe types of the subframes used in the subframe aggregation, the subframe types include a second subframe type, subframes corresponding to the second subframe type include a time domain symbol used for downlink transmission, a guard period GP, and a time domain symbol used for uplink transmission, and a quantity of time domain symbols used for downlink transmission is less than a quantity of time domain symbols used for uplink transmission.

With reference to the thirteenth possible implementation of the first aspect, in a fourteenth possible implementation, a subframe aggregation information field in a downlink control information format corresponding to the downlink control information occupies three information bits, and specifically:

when a value corresponding to the subframe aggregation information field is 000, the quantity of the subframes used in the subframe aggregation is one, a redundancy version corresponding to a first subframe in the subframes used in the subframe aggregation is indicated by a modulation and coding scheme and a redundancy version domain in the downlink control information format, and a subframe type of the first subframe in the subframes used in the subframe aggregation is uplink subframe;

when a value corresponding to the subframe aggregation information field is 001, the quantity of the subframes used in the subframe aggregation is one, a redundancy version corresponding to a first subframe in the subframes used in the subframe aggregation is indicated by a modulation and coding scheme and a redundancy version domain in the downlink control information format, and a subframe type of the first subframe in the subframes used in the subframe aggregation is a second subframe type;

when a value corresponding to the subframe aggregation information field is 010, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both uplink subframe;

when a value corresponding to the subframe aggregation information field is 011, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, a subframe type of the first subframe in the subframes used in the subframe aggregation is a second subframe type, and a subframe type of the second subframe in the subframes used in the subframe aggregation is uplink subframe;

when a value corresponding to the subframe aggregation information field is 100, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both uplink subframe;

when a value corresponding to the subframe aggregation information field is 101, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, a subframe type of the first subframe in the subframes used in the subframe aggregation is a second subframe type, and a subframe type of the second subframe in the subframes used in the subframe aggregation is uplink subframe;

when a value corresponding to the subframe aggregation information field is 110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, subframe types of the second subframe, a third subframe, and a fourth subframe in the subframes used in the subframe aggregation are all uplink subframe, and a subframe type of the first subframe in the subframes used in the subframe aggregation is a second subframe type; or when a value corresponding to the subframe aggregation information field is 111, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, and subframe types of the first subframe, the second subframe, a third subframe, and a fourth subframe in the subframes used in the subframe aggregation are all a second subframe type.

With reference to the third possible implementation of the first aspect, in a fifteenth possible implementation, the first device scrambles a cyclic redundancy check CRC of the downlink control information by using a radio network temporary identifier RNTI, where the RNTI indicates a transmission time interval TTI length corresponding to a physical downlink shared channel scheduled by using the downlink control information, and different RNTIs correspond to different TTI lengths. According to a second aspect, an information transmission method is provided, including: receiving, by a second device, downlink control information sent by a first device, where the downlink control information includes subframe aggregation information, and the subframe aggregation information is used to indicate a quantity of subframes used in subframe aggregation and/or a redundancy version corresponding to at least one of subframes used in subframe aggregation; and sending, by the second device, uplink information to the first device according to the downlink control information.

The second device receives the downlink control information sent by the first device, where the downlink control information includes the subframe aggregation information, obtains, according to the subframe aggregation information, the quantity of the subframes used in the subframe aggregation and/or the redundancy version corresponding to the at least one of the subframes used in the subframe aggregation, and performs corresponding processing. Therefore, the quantity of the subframes used in the subframe aggregation is dynamically indicated based on a channel condition, so that resources are efficiently used, spectrum utilization is improved, and data transmission reliability can be ensured. Moreover, use of consecutive subframes for transmission can reduce a service delay while ensuring transmission reliability. For a user whose channel condition is favorable, use of fewer subframes for transmission can further reduce the service delay, thereby better serving a low-latency and highly-reliable service.

In a first possible implementation of the second aspect, the downlink control information is used to schedule downlink data transmission, and the uplink information is a hybrid automatic repeat request-acknowledgment corresponding to the downlink data transmission.

In a second possible implementation of the second aspect, the downlink control information is used to schedule uplink data transmission, and the uplink information is uplink data scheduled by using uplink control information.

With reference to the second aspect or the first possible implementation of the second aspect, in a third possible implementation, the subframe aggregation information corresponds to a redundancy version in the downlink control information, and the subframe aggregation information indicates a redundancy version corresponding to a first subframe in the subframes used in the subframe aggregation.

With reference to the third possible implementation of the second aspect, in a fourth possible implementation, the second device receives radio resource control signaling sent by the first device; and the second device determines, according to the radio resource control signaling, the quantity of the subframes used in the subframe aggregation.

With reference to the third possible implementation of the second aspect, in a fifth possible implementation, the second device determines, according to a radio network temporary identifier RNTI used to scramble a cyclic redundancy check CRC of the downlink control information, the quantity of the subframes used in the subframe aggregation, where different RNTIs correspond to different subframe quantities.

With reference to either of the fourth possible implementation and the fifth possible implementation of the second aspect, in a sixth possible implementation, the second device determines, based on the quantity of the subframes used in the subframe aggregation and the redundancy version corresponding to the first subframe in the subframes used in the subframe aggregation, redundancy versions corresponding to remaining subframes in the subframes used in the subframe aggregation, specifically including:

using, as a starting point by the second device, the redundancy version corresponding to the first subframe in the subframes used in the subframe aggregation, and obtaining X redundancy versions in a sequential order of redundancy versions 0, 2, 3, and 1 in a cyclic repetition manner, where X is equal to the quantity of the subframes used in the subframe aggregation, and the X redundancy versions are in a one-to-one correspondence to the subframes used in the subframe aggregation.

With reference to the second aspect or the first possible implementation of the second aspect, in a seventh possible implementation, a subframe aggregation information field in a downlink control information format corresponding to the downlink control information occupies three information bits.

With reference to the seventh possible implementation of the second aspect, in an eighth possible implementation, when a value corresponding to the subframe aggregation information field is 000, the quantity of the subframes used in the subframe aggregation is one, and a redundancy version corresponding to a first subframe in the subframes used in the subframe aggregation is 0;

when a value corresponding to the subframe aggregation information field is 001, the quantity of the subframes used in the subframe aggregation is one, and a redundancy version corresponding to a first subframe in the subframes used in the subframe aggregation is 1;

when a value corresponding to the subframe aggregation information field is 010, the quantity of the subframes used in the subframe aggregation is one, and a redundancy version corresponding to a first subframe in the subframes used in the subframe aggregation is 2;

when a value corresponding to the subframe aggregation information field is 011, the quantity of the subframes used in the subframe aggregation is one, and a redundancy version corresponding to a first subframe in the subframes used in the subframe aggregation is 3;

when a value corresponding to the subframe aggregation information field is 100, the quantity of the subframes used in the subframe aggregation is two, a redundancy version corresponding to a first subframe in the subframes used in the subframe aggregation is 0, and a redundancy version corresponding to a second subframe in the subframes used in the subframe aggregation is 2;

when a value corresponding to the subframe aggregation information field is 101, the quantity of the subframes used in the subframe aggregation is two, a redundancy version corresponding to a first subframe in the subframes used in the subframe aggregation is 3, and a redundancy version corresponding to a second subframe in the subframes used in the subframe aggregation is 1; or when a value corresponding to the subframe aggregation information field is 110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to a third subframe in the subframes used in the subframe aggregation is 3, and a redundancy version corresponding to a fourth subframe in the subframes used in the subframe aggregation is 1.

With reference to the second aspect or the first possible implementation of the second aspect, in a ninth possible implementation, the subframe aggregation information is further used to indicate subframe types of the subframes used in the subframe aggregation, the subframe types include a first subframe type, subframes corresponding to the first subframe type include a time domain symbol used for downlink transmission, a guard period GP, and a time domain symbol used for uplink transmission, and a quantity of time domain symbols used for downlink transmission is greater than or equal to a quantity of time domain symbols used for uplink transmission.

With reference to the ninth possible implementation of the second aspect, in a tenth possible implementation, a subframe aggregation information field in a downlink control information format corresponding to the downlink control information occupies four information bits, and specifically:

when a value corresponding to the subframe aggregation information field is 0000, the quantity of the subframes used in the subframe aggregation is one, a redundancy version corresponding to a first subframe in the subframes used in the subframe aggregation is 0, and a subframe type of the first subframe in the subframes used in the subframe aggregation is downlink subframe;

when a value corresponding to the subframe aggregation information field is 0001, the quantity of the subframes used in the subframe aggregation is one, a redundancy version corresponding to a first subframe in the subframes used in the subframe aggregation is 0, and a subframe type of the first subframe in the subframes used in the subframe aggregation is a first subframe type;

when a value corresponding to the subframe aggregation information field is 0010, the quantity of the subframes used in the subframe aggregation is one, a redundancy version corresponding to a first subframe in the subframes used in the subframe aggregation is 1, and a subframe type of the first subframe in the subframes used in the subframe aggregation is downlink subframe;

when a value corresponding to the subframe aggregation information field is 0011, the quantity of the subframes used in the subframe aggregation is one, a redundancy version corresponding to a first subframe in the subframes used in the subframe aggregation is 1, and a subframe type of the first subframe in the subframes used in the subframe aggregation is a first subframe type;

when a value corresponding to the subframe aggregation information field is 0100, the quantity of the subframes used in the subframe aggregation is one, a redundancy version corresponding to a first subframe in the subframes used in the subframe aggregation is 2, and a subframe type of the first subframe in the subframes used in the subframe aggregation is downlink subframe;

when a value corresponding to the subframe aggregation information field is 0101, the quantity of the subframes used in the subframe aggregation is one, a redundancy version corresponding to a first subframe in the subframes used in the subframe aggregation is 2, and a subframe type of the first subframe in the subframes used in the subframe aggregation is a first subframe type;

when a value corresponding to the subframe aggregation information field is 0110, the quantity of the subframes used in the subframe aggregation is one, a redundancy version corresponding to a first subframe in the subframes used in the subframe aggregation is 3, and a subframe type of the first subframe in the subframes used in the subframe aggregation is downlink subframe;

when a value corresponding to the subframe aggregation information field is 0111, the quantity of the subframes used in the subframe aggregation is one, a redundancy version corresponding to a first subframe in the subframes used in the subframe aggregation is 3, and a subframe type of the first subframe in the subframes used in the subframe aggregation is a first subframe type;

when a value corresponding to the subframe aggregation information field is 1000, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both downlink subframe;

when a value corresponding to the subframe aggregation information field is 1001, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, a subframe type of the first subframe in the subframes used in the subframe aggregation is downlink subframe, and a subframe type of the second subframe in the subframes used in the subframe aggregation is a first subframe type;

when a value corresponding to the subframe aggregation information field is 1010, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both a first subframe type;

when a value corresponding to the subframe aggregation information field is 1011, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both downlink subframe;

when a value corresponding to the subframe aggregation information field is 1100, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, a subframe type of the first subframe in the subframes used in the subframe aggregation is downlink subframe, and a subframe type of the second subframe in the subframes used in the subframe aggregation is a first subframe type;

when a value corresponding to the subframe aggregation information field is 1101, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both a first subframe type;

when a value corresponding to the subframe aggregation information field is 1110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, subframe types of the first subframe, the second subframe, and a third subframe in the subframes used in the subframe aggregation are all downlink subframe, and a subframe type of a fourth subframe in the subframes used in the subframe aggregation is a first subframe type; or when a value corresponding to the subframe aggregation information field is 1111, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, and subframe types of the first subframe, the second subframe, a third subframe, and a fourth subframe in the subframes used in the subframe aggregation are all a first subframe type.

With reference to either of the ninth possible implementation and the tenth possible implementation of the second aspect, in an eleventh possible implementation, the downlink control information includes hybrid automatic repeat request-acknowledgment subframe information, where the hybrid automatic repeat request-acknowledgment subframe information is used to indicate a subframe of the hybrid automatic repeat request-acknowledgment corresponding to the downlink data transmission scheduled by using the downlink control information.

With reference to the second aspect or the second possible implementation of the second aspect, in a twelfth possible implementation, a subframe aggregation information field in a downlink control information format corresponding to the downlink control information occupies two information bits, and specifically:

when a value corresponding to the subframe aggregation information field is 00, the quantity of the subframes used in the subframe aggregation is one, and a redundancy version corresponding to a first subframe in the subframes used in the subframe aggregation is indicated by a modulation and coding scheme and a redundancy version domain in the downlink control information format;

when a value corresponding to the subframe aggregation information field is 01, the quantity of the subframes used in the subframe aggregation is two, a redundancy version corresponding to a first subframe in the subframes used in the subframe aggregation is 0, and a redundancy version corresponding to a second subframe in the subframes used in the subframe aggregation is 2;

when a value corresponding to the subframe aggregation information field is 10, the quantity of the subframes used in the subframe aggregation is two, a redundancy version corresponding to a first subframe in the subframes used in the subframe aggregation is 3, and a redundancy version corresponding to a second subframe in the subframes used in the subframe aggregation is 1; or when a value corresponding to the subframe aggregation information field is 11, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to a third subframe in the subframes used in the subframe aggregation is 3, and a redundancy version corresponding to a fourth subframe in the subframes used in the subframe aggregation is 1.

With reference to the second aspect or the second possible implementation of the second aspect, in a thirteenth possible implementation, the subframe aggregation information is further used to indicate subframe types of the subframes used in the subframe aggregation, the subframe types include a second subframe type, subframes corresponding to the second subframe type include a time domain symbol used for downlink transmission, a guard period GP, and a time domain symbol used for uplink transmission, and a quantity of time domain symbols used for downlink transmission is less than a quantity of time domain symbols used for uplink transmission.

With reference to the thirteenth possible implementation of the second aspect, in a fourteenth possible implementation, a subframe aggregation information field in a downlink control information format corresponding to the downlink control information occupies three information bits, and specifically:

when a value corresponding to the subframe aggregation information field is 000, the quantity of the subframes used in the subframe aggregation is one, a redundancy version corresponding to a first subframe in the subframes used in the subframe aggregation is indicated by a modulation and coding scheme and a redundancy version domain in the downlink control information format, and a subframe type of the first subframe in the subframes used in the subframe aggregation is uplink subframe;

when a value corresponding to the subframe aggregation information field is 001, the quantity of the subframes used in the subframe aggregation is one, a redundancy version corresponding to a first subframe in the subframes used in the subframe aggregation is indicated by a modulation and coding scheme and a redundancy version domain in the downlink control information format, and a subframe type of the first subframe in the subframes used in the subframe aggregation is a second subframe type;

when a value corresponding to the subframe aggregation information field is 010, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both uplink subframe;

when a value corresponding to the subframe aggregation information field is 011, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, a subframe type of the first subframe in the subframes used in the subframe aggregation is a second subframe type, and a subframe type of the second subframe in the subframes used in the subframe aggregation is uplink subframe;

when a value corresponding to the subframe aggregation information field is 100, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both uplink subframe;

when a value corresponding to the subframe aggregation information field is 101, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, a subframe type of the first subframe in the subframes used in the subframe aggregation is a second subframe type, and a subframe type of the second subframe in the subframes used in the subframe aggregation is uplink subframe;

when a value corresponding to the subframe aggregation information field is 110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, subframe types of the second subframe, a third subframe, and a fourth subframe in the subframes used in the subframe aggregation are all uplink subframe, and a subframe type of the first subframe in the subframes used in the subframe aggregation is a second subframe type; or when a value corresponding to the subframe aggregation information field is 111, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, and subframe types of the first subframe, the second subframe, a third subframe, and a fourth subframe in the subframes used in the subframe aggregation are all a second subframe type.

With reference to the third possible implementation of the second aspect, in a fifteenth possible implementation, the second device determines, according to a radio network temporary identifier RNTI used to scramble a cyclic redundancy check CRC of the downlink control information, a transmission time interval TTI length corresponding to a physical downlink shared channel scheduled by using the downlink control information, where different RNTIs correspond to different TTI lengths.

With reference to the third possible implementation of the second aspect, in a sixteenth possible implementation, the second device determines, according to a radio network temporary identifier RNTI used to scramble a cyclic redundancy check CRC of the downlink control information, a hybrid automatic repeat request-acknowledgment timing corresponding to a physical downlink shared channel scheduled by using the downlink control information, where different RNTIs correspond to different hybrid automatic repeat request-acknowledgment timings.

With reference to the first possible implementation of the second aspect, in a seventeenth possible implementation, the second device determines, according to the subframe aggregation information, the quantity of the subframes used in the subframe aggregation and/or the redundancy version corresponding to the at least one of the subframes used in the subframe aggregation; and the second device decodes, according to the determined quantity of the subframes used in the subframe aggregation and/or the determined redundancy version corresponding to the at least one of the subframes used in the subframe aggregation, the downlink data transmission scheduled by using the downlink control information.

With reference to the second possible implementation of the second aspect, in an eighteenth possible implementation, the second device determines, according to the subframe aggregation information, the quantity of the subframes used in the subframe aggregation and/or the redundancy version corresponding to the at least one of the subframes used in the subframe aggregation; and the second device encodes, according to the determined quantity of the subframes used in the subframe aggregation and/or the determined redundancy version corresponding to the at least one of the subframes used in the subframe aggregation, the uplink data transmission scheduled by using the downlink control information.

According to a third aspect, an information transmission apparatus is provided, configured to perform the information transmission method according to the first aspect and any possible implementation of the first aspect, and includes:

a processing unit, configured to generate downlink control information, where the downlink control information includes subframe aggregation information, and the subframe aggregation information is used by a first device to indicate, to a second device, a quantity of subframes used in subframe aggregation and/or a redundancy version corresponding to at least one of subframes used in subframe aggregation; and a transceiver unit, configured to: send the downlink control information to the second device, and receive uplink information sent by the second device according to the downlink control information.

According to a fourth aspect, an information transmission apparatus is provided, configured to perform the information transmission method according to the second aspect and any possible implementation of the second aspect, and includes: a transceiver unit, configured to: receive downlink control information sent by a first device, and send uplink information to the first device; and a processing unit, configured to generate the uplink information according to the downlink control information, where the downlink control information includes subframe aggregation information, and the subframe aggregation information is used to indicate a quantity of subframes used in subframe aggregation and/or a redundancy version corresponding to at least one of subframes used in subframe aggregation.

According to a fifth aspect, a base station is provided, including: a processor, a transceiver, a memory, and a bus. The processor, the transceiver, and the memory are connected to and communicate with each other by using the bus. The processor is configured to execute a program in the memory, to perform, in cooperation with the transceiver, the method according to the first aspect or a possible implementation of the first aspect.

The transceiver is configured to perform a function of the transceiver unit according to the third aspect or a possible implementation of the third aspect.

According to a sixth aspect, user equipment is provided, including: a processor, a transceiver, a memory, and a bus. The processor, the transceiver, and the memory are connected to and communicate with each other by using the bus.

The processor is configured to execute a program in the memory, to perform, in cooperation with the transceiver, the method according to the second aspect or a possible implementation of the second aspect.

The transceiver is configured to perform a function of the transceiver unit according to the fourth aspect or a possible implementation of the fourth aspect.

BRIEF DESCRIPTION OF DRAWINGS

To describe the technical solutions in the embodiments of the present disclosure, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
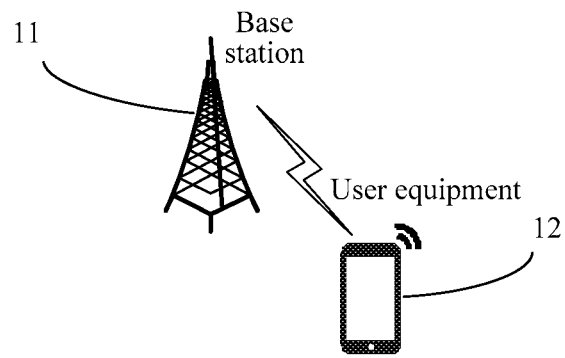
FIG. 1 is a schematic structural diagram of a communications system according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Terms such as "unit", "component", "module", and "system" used in this application are used to indicate computer-related entities. The computer-related entities may be hardware, firmware, combinations of hardware and software, software, or software in running. For example, a component may be, but is not limited to, a process that runs on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the Internet by using a signal).

In addition, in this application, a first device may be a base station, and the base station may be configured to communicate with one or more user equipments, or may be configured to communicate with one or more base stations having some functions of user equipment (for example, communication between a macro base station and a micro base station, such as an access point). The base station in the embodiments of the present disclosure may alternatively be referred to as an evolved NodeB (eNodeB). A second device may be user equipment (UE), and the user equipment may be configured to communicate with one or more user equipments (for example, Device-to-Device communication), or may be configured to communicate with one or more base stations. The user equipment may be further referred to as a user terminal, and may include some or all of functions of a system, a user unit, a user station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless telephone set, a Session Initiation Protocol (SIP) telephone, a smartphone, a wireless local loop (WLL) station, a personal digital assistant (PDA), a laptop computer, a handheld communications device, a handheld computing device, a satellite wireless device, a wireless modem card, and/or another processing device for communicating in a wireless system. The base station may further be referred to as an access point, a node, a node B, an evolved NodeB (eNodeB), or another network entity, and may include some or all of functions of the foregoing network entity. The base station may communicate with a wireless terminal by using an air interface. The communication may be performed by using one or more sectors. The base station may serve as a router between a wireless terminal and a remaining part of an access network by converting a received frame of the air interface into an IP packet, where the access network includes an Internet Protocol (IP) network. The base station may further coordinate management of an attribute of the air interface, and may further be a gateway between a wired network and a wireless network.

All aspects, embodiments, or features are presented in this application by describing a system that may include a plurality of devices, components, modules, and the like. It should be understood that each system may include another device, component, module, or the like; and/or may not include any of the devices, components, modules, and the like discussed with reference to the accompany drawings. In addition, a combination of these solutions may be used.

Moreover, in the embodiments of the present disclosure, the phrase "for example" is used to indicate an example, an instance, or a description. Any embodiment or design solution described as an "example" in this application should not be construed as being preferred to or having advantages over other embodiments or design solutions. Exactly, "for example" is used to present a concept in a specific manner.

In the embodiments of the present disclosure, information, signal, message, or channel may be interchangeable sometimes. It should be noted that expressed meanings are consistent when differences are not emphasized. "Of", "corresponding, relevant" may be interchangeable sometimes. It should be noted that the words represent a same meaning if their differences are not emphasized.

A network architecture and a service scenario that are described in the embodiments of the present disclosure are intended to describe the technical solutions in the embodiments of the present disclosure more clearly, and do not constitute any limitation to the technical solutions provided in the embodiments of the present disclosure. A person of ordinary skill in the art may learn that with evolution of network architectures and appearance of new service scenarios, the technical solutions provided in the embodiments of the present disclosure are also applicable to similar technical problems.

The embodiments of the present disclosure are described based on an LTE system scenario and an LTE-Advanced system scenario in a wireless communications network. It should be noted that the solutions in the embodiments of the present disclosure are also applicable to another wireless communications network, and a corresponding name may be substituted for a name of a corresponding function in the another wireless communications network.

The embodiments of the present disclosure are applied to a communications system shown in FIG. 1. The communications system includes a first device and a second device. The first device is described by using a base station as an example, and the second device is described by using user equipment as an example.

Specifically, in the foregoing communications system, the base station 11 sends downlink control information to the user equipment 12. The downlink control information includes subframe aggregation information. The user equipment 12 sends uplink information to the base station 11 according to the received downlink control information. When the base station 11 sends, to the user equipment 12, downlink control information for scheduling downlink data, the user equipment 12 sends, to the base station 11 according to the received downlink control information for scheduling downlink data, hybrid automatic repeat request-acknowledgment information corresponding to the downlink data. When the base station 11 sends, to the user equipment 12 downlink control information for scheduling uplink data, the user equipment 12 sends uplink data to the base station 11 according to the received downlink control information for scheduling uplink data. The foregoing communications system may be an LTE system or an LTE-advanced system.

It should be noted that a subframe in all the embodiments of the present disclosure may be substituted for a transmission time interval TTI. Unless otherwise specifically stated, steps in all the embodiments of the present disclosure are not performed in a sequential order and may be independent of each other.

In LTE-Advanced, TDD is evolved, and the evolved TDD system may be referred to as a TDD Universal (TDD-U) system. A frame structure corresponding to the TDD-U system includes not only a downlink subframe, an uplink subframe, and a special subframe in an LTE system, but also introduces two new types of subframes: a first subframe type S1 and a second subframe type S2. A subframe S1 and a subframe S2 each include a symbol for downlink transmission, a guard period (GP), and a symbol for uplink transmission. In the subframe S1, the symbol for downlink transmission is mainly used for physical downlink control channel transmission and downlink data transmission, and the symbol for uplink transmission is mainly used for physical uplink control channel (PUCCH), uplink control information, and channel sounding reference signal (SRS) transmission. In the subframe S2, the symbol for downlink transmission is mainly used for physical downlink control channel (PDCCH) and physical downlink shared channel (PDSCH) transmission, and the symbol for uplink transmission is mainly used for physical uplink shared channel (PUSCH), PUCCH, and SRS transmission. The TDD-U system implements a unified HARQ timing, uplink and downlink rapid HARQ feedbacks, flexible TDD uplink and downlink configurations, and the like by introducing the two new types of subframes. However, the subframe S1 and the subframe S2 each include a guard period GP, and larger quantities of subframes S1 and subframes S2 in a radio frame indicate higher GP overheads. Therefore, gains and overheads caused by the subframes S1 and the subframes S2 need to be well balanced.

Figure 2:
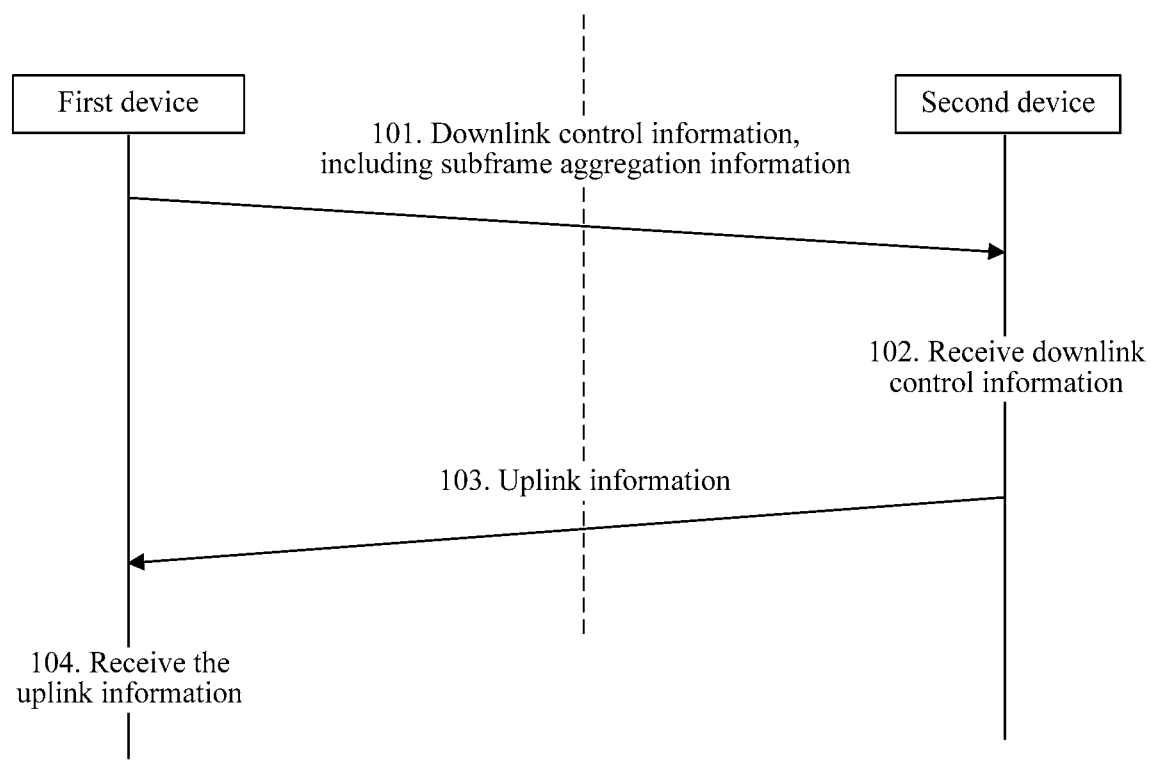
FIG. 2 is a schematic flowchart of an information transmission method according to an embodiment of the present disclosure.

An embodiment of the present disclosure provides an information transmission method, applied to the foregoing communications system. For example, the method may be applied to an LTE system and an LTE-Advanced system. As shown in FIG. 2, the method includes the following steps.

101. A first device sends downlink control information to a second device, where the downlink control information includes subframe aggregation information.

One subframe or a plurality of consecutive subframes are used for data transmission in subframe aggregation. When a plurality of consecutive subframes are used in the subframe aggregation, different redundancy versions of one transport block (TB) are transmitted by using the plurality of subframes used in the subframe aggregation.

The subframe aggregation information in this embodiment of the present disclosure may be used by the first device to indicate, to the second device, a quantity of subframes used in the subframe aggregation, or may be used by the first device to indicate, to the second device, a redundancy version corresponding to at least one of subframes used in the subframe aggregation, or may be used by the first device to indicate, to the second device, a quantity of subframes used in the subframe aggregation and a redundancy version corresponding to at least one of subframes used in the subframe aggregation. Alternatively, the subframe aggregation information may be used by the first device to indicate, to the second device, a quantity of subframes occupied by data transmission scheduled by using the downlink control information, or may be used by the first device to indicate, to the second device, a redundancy version corresponding to at least one of subframes occupied by data transmission scheduled by using the downlink control information, or may be used by the first device to indicate, to the second device, a quantity of subframes occupied by data transmission scheduled by using the downlink control information, and a redundancy version corresponding to at least one of the subframes occupied by the data transmission scheduled by using the downlink control information.

Optionally, the downlink control information may be alternatively used to schedule downlink data transmission. In this case, uplink information in step 103 is a hybrid automatic repeat request-acknowledgment corresponding to the downlink data transmission.

Further, optionally, a subframe aggregation information field in a downlink control information format corresponding to the downlink control information occupies three information bits. The 3-bit subframe aggregation information may be used to indicate the quantity of the subframes used in the subframe aggregation and the redundancy version corresponding to at least one of the subframes used in the subframe aggregation. This may be specifically:

when a value corresponding to the subframe aggregation information field is 000, the quantity of the subframes used in the subframe aggregation is one, and a redundancy version corresponding to a first subframe in the subframes used in the subframe aggregation is 0;

when a value corresponding to the subframe aggregation information field is 001, the quantity of the subframes used in the subframe aggregation is one, and a redundancy version corresponding to a first subframe in the subframes used in the subframe aggregation is 1;

when a value corresponding to the subframe aggregation information field is 010, the quantity of the subframes used in the subframe aggregation is one, and a redundancy version corresponding to a first subframe in the subframes used in the subframe aggregation is 2;

when a value corresponding to the subframe aggregation information field is 011, the quantity of the subframes used in the subframe aggregation is one, and a redundancy version corresponding to a first subframe in the subframes used in the subframe aggregation is 3;

when a value corresponding to the subframe aggregation information field is 100, the quantity of the subframes used in the subframe aggregation is two, a redundancy version corresponding to a first subframe in the subframes used in the subframe aggregation is 0, and a redundancy version corresponding to a second subframe in the subframes used in the subframe aggregation is 2;

when a value corresponding to the subframe aggregation information field is 101, the quantity of the subframes used in the subframe aggregation is two, a redundancy version corresponding to a first subframe in the subframes used in the subframe aggregation is 3, and a redundancy version corresponding to a second subframe in the subframes used in the subframe aggregation is 1;

when a value corresponding to the subframe aggregation information field is 110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to a third subframe in the subframes used in the subframe aggregation is 3, and a redundancy version corresponding to a fourth subframe in the subframes used in the subframe aggregation is 1; or when a value corresponding to the subframe aggregation information field is 111, the quantity of the subframes used in the subframe aggregation is three, a redundancy version corresponding to a first subframe in the subframes used in the subframe aggregation is 0, a redundancy version corresponding to a second subframe in the subframes used in the subframe aggregation is 2, and a redundancy version corresponding to a third subframe in the subframes used in the subframe aggregation is 3; or when a value corresponding to the subframe aggregation information field is 111, no definition is provided, and the value 111 is in a reserved state.

Further, the three information bits occupied by the subframe aggregation information field may include a 2-bit redundancy version and one newly added bit in an existing downlink control information format.

In this step, the quantity of the subframes used in the subframe aggregation is dynamically indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

Moreover, in this embodiment of the present disclosure, the quantity of the subframes used in the subframe aggregation and the redundancy versions of the used subframes are jointly indicated by using the subframe aggregation information field, so that typical combined indication is implemented by using only three information bits. This, compared with a case in which two bits are used to indicate the quantity of the subframes used in the subframe aggregation and two bits are used to indicate the redundancy versions, reduces bit overheads, reduces load of the downlink control information, and improves transmission reliability of the downlink control information.

102. The second device receives the downlink control information sent by the first device, where the downlink control information includes the subframe aggregation information.

A description of the subframe aggregation information is similar to that in step 101. Details are not described herein again.

103. The second device sends uplink information according to the downlink control information received in step 102.

In this step, the uplink information may be a hybrid automatic repeat request-acknowledgment corresponding to the downlink data transmission.

Further, this step may be:

the second device determines, according to the subframe aggregation information, the quantity of the subframes used in the subframe aggregation or the redundancy version corresponding to the at least one of the subframes used in the subframe aggregation, or determine the quantity of the subframes used in the subframe aggregation and the redundancy version corresponding to the at least one of the subframes used in the subframe aggregation;

the second device decodes, according to the determined quantity of the subframes used in the subframe aggregation, or the determined redundancy version corresponding to the at least one of the subframes used in the subframe aggregation, or the determined quantity of the subframes used in the subframe aggregation and the determined redundancy version corresponding to the at least one of the subframes used in the subframe aggregation, the downlink data transmission scheduled by using the downlink control information; and the second device determines, according to a result of the decoding of the downlink data transmission scheduled by using the downlink control information, a hybrid automatic repeat request-acknowledgment corresponding to the downlink data transmission, and sends the determined hybrid automatic repeat request-acknowledgment corresponding to the downlink data transmission.

104. The first device receives the uplink information sent by the second device according to the downlink control information.

In this step, the first device receives the hybrid automatic repeat request-acknowledgment sent by the second device. The hybrid automatic repeat request-acknowledgment is a hybrid automatic repeat request-acknowledgment (HARQ-ACK) corresponding to the downlink data transmission scheduled by using the downlink control information.

In the method provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and/or the redundancy version corresponding to the at least one of the subframes used in the subframe aggregation, or obtain, according to the subframe aggregation information, the redundancy version corresponding to the at least one of the subframes used in the subframe aggregation, or obtain, according to the subframe aggregation information, the quantity of the subframes used in the subframe aggregation and the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

Figure 3:
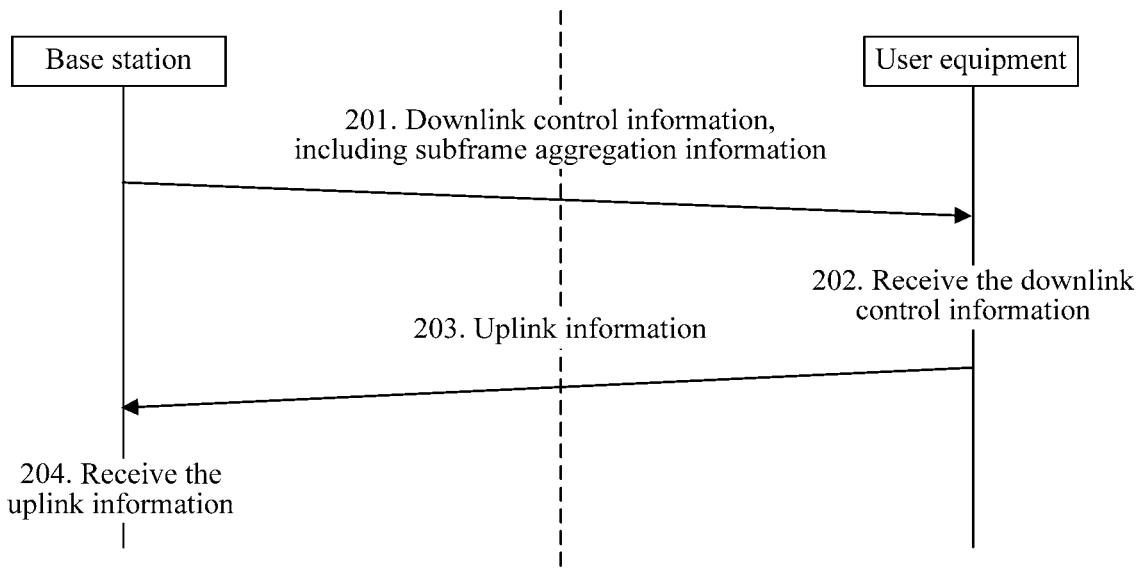
FIG. 3 is a schematic flowchart of an information transmission method according to another embodiment of the present disclosure.

An embodiment of the present disclosure provides an information transmission method, applicable to an evolved TDD system, for example, a TDD-U system. As shown in FIG. 3, the method includes the following steps.

201. A first device sends downlink control information to a second device, where the downlink control information includes subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation.

The subframe aggregation information in this embodiment of the present disclosure may be used by the first device to indicate, to the second device, a quantity of subframes used in the subframe aggregation and/or a redundancy version corresponding to at least one of subframes used in the subframe aggregation. Alternatively, the subframe aggregation information may be used by the first device to indicate, to the second device, a quantity of subframes occupied by data transmission scheduled by using the downlink control information and/or a redundancy version corresponding to at least one of subframes occupied by data transmission scheduled by using the downlink control information.

The downlink control information may be used to schedule downlink data transmission. In this case, uplink information in step 203 is a hybrid automatic repeat request-acknowledgment corresponding to the downlink data transmission.

Further, optionally, the subframe aggregation information in this embodiment of the present disclosure is further used to indicate subframe types of the subframes used in the subframe aggregation. The subframe type includes a first subframe type. Subframes corresponding to the first subframe type include a time domain symbol used for downlink transmission, a guard period GP, and a time domain symbol used for uplink transmission. A quantity of time domain symbols used for downlink transmission is greater than or equal to a quantity of time domain symbols used for uplink transmission. The time domain symbol used for uplink transmission may be used for uplink control information transmission, and/or sounding reference signal SRS transmission, and/or uplink data transmission.

Further, optionally, in this embodiment of the present disclosure, a subframe aggregation information field in a downlink control information format corresponding to the downlink control information occupies four information bits. The 4-bit subframe aggregation information may be used to indicate the quantity of the subframes used in the subframe aggregation, the redundancy version corresponding to the at least one of the subframes used in the subframe aggregation, and the subframe types of the subframes used in the subframe aggregation. This may be specifically:

when a value corresponding to the subframe aggregation information field is 0000, the quantity of the subframes used in the subframe aggregation is one, a redundancy version corresponding to a first subframe in the subframes used in the subframe aggregation is 0, and a subframe type of the first subframe in the subframes used in the subframe aggregation is downlink subframe;

when a value corresponding to the subframe aggregation information field is 0001, the quantity of the subframes used in the subframe aggregation is one, a redundancy version corresponding to a first subframe in the subframes used in the subframe aggregation is 0, and a subframe type of the first subframe in the subframes used in the subframe aggregation is a first subframe type;

when a value corresponding to the subframe aggregation information field is 0010, the quantity of the subframes used in the subframe aggregation is one, a redundancy version corresponding to a first subframe in the subframes used in the subframe aggregation is 1, and a subframe type of the first subframe in the subframes used in the subframe aggregation is downlink subframe;

when a value corresponding to the subframe aggregation information field is 0011, the quantity of the subframes used in the subframe aggregation is one, a redundancy version corresponding to a first subframe in the subframes used in the subframe aggregation is 1, and a subframe type of the first subframe in the subframes used in the subframe aggregation is a first subframe type;

when a value corresponding to the subframe aggregation information field is 0100, the quantity of the subframes used in the subframe aggregation is one, a redundancy version corresponding to a first subframe in the subframes used in the subframe aggregation is 2, and a subframe type of the first subframe in the subframes used in the subframe aggregation is downlink subframe;

when a value corresponding to the subframe aggregation information field is 0101, the quantity of the subframes used in the subframe aggregation is one, a redundancy version corresponding to a first subframe in the subframes used in the subframe aggregation is 2, and a subframe type of the first subframe in the subframes used in the subframe aggregation is a first subframe type;

when a value corresponding to the subframe aggregation information field is 0110, the quantity of the subframes used in the subframe aggregation is one, a redundancy version corresponding to a first subframe in the subframes used in the subframe aggregation is 3, and a subframe type of the first subframe in the subframes used in the subframe aggregation is downlink subframe;

when a value corresponding to the subframe aggregation information field is 0111, the quantity of the subframes used in the subframe aggregation is one, a redundancy version corresponding to a first subframe in the subframes used in the subframe aggregation is 3, and a subframe type of the first subframe in the subframes used in the subframe aggregation is a first subframe type;

when a value corresponding to the subframe aggregation information field is 1000, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both downlink subframe;

when a value corresponding to the subframe aggregation information field is 1001, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, a subframe type of the first subframe in the subframes used in the subframe aggregation is downlink subframe, and a subframe type of the second subframe in the subframes used in the subframe aggregation is a first subframe type;

when a value corresponding to the subframe aggregation information field is 1010, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both a first subframe type;

when a value corresponding to the subframe aggregation information field is 1011, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both downlink subframe;

when a value corresponding to the subframe aggregation information field is 1100, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, a subframe type of the first subframe in the subframes used in the subframe aggregation is downlink subframe, and a subframe type of the second subframe in the subframes used in the subframe aggregation is a first subframe type;

when a value corresponding to the subframe aggregation information field is 1101, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both a first subframe type;

when a value corresponding to the subframe aggregation information field is 1110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, subframe types of the first subframe, the second subframe, and a third subframe in the subframes used in the subframe aggregation are all downlink subframe, and a subframe type of a fourth subframe in the subframes used in the subframe aggregation is a first subframe type; or when a value corresponding to the subframe aggregation information field is 1111, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, and subframe types of the first subframe, the second subframe, a third subframe, and a fourth subframe in the subframes used in the subframe aggregation are all a first subframe type.

Further, optionally, the downlink control information includes hybrid automatic repeat request-acknowledgment subframe information. The hybrid automatic repeat request-acknowledgment subframe information is used to indicate a subframe of the hybrid automatic repeat request-acknowledgment corresponding to the downlink data transmission scheduled by using the downlink control information.

Further, the four information bits occupied by the subframe aggregation information field may include a 2-bit redundancy version and two newly added bits in an existing downlink control information format.

In this step, the quantity of the subframes used in the subframe aggregation and the redundancy version are indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S1 can be flexibly configured according to an actual situation, and system performance is improved by using the S1 subframes while GP overheads are proper.

Moreover, in this embodiment of the present disclosure, the quantity of the subframes used in the subframe aggregation, the redundancy versions of the used subframes, and the subframe types of the used subframes are jointly indicated by using the subframe aggregation information field, so that typical combined indication is implemented by using only four information bits. This, compared with a case in which two bits are used to indicate the quantity of the subframes used in the subframe aggregation, two bits are used to indicate the redundancy versions, and two bits are used to indicate the subframe types, reduces bit overheads, reduces load of the downlink control information, and improves transmission reliability of the downlink control information.

202. The second device receives the downlink control information sent by the first device, where the downlink control information includes the subframe aggregation information.

A description of the subframe aggregation information is similar to that in step 201. Details are not described herein again.

203. The second device sends uplink information according to the downlink control information received in step 202.

In this step, the uplink information may be a hybrid automatic repeat request-acknowledgment corresponding to the downlink data transmission.

Further, this step may be:

the second device determines, according to the subframe aggregation information, the quantity of the subframes used in the subframe aggregation, the redundancy version corresponding to the at least one of the subframes used in the subframe aggregation, and the subframe types of the subframes used in the subframe aggregation;

the second device decodes, according to the determined quantity of the subframes used in the subframe aggregation, the determined redundancy version corresponding to the at least one of the subframes used in the subframe aggregation, and the determined subframe types of the subframes used in the subframe aggregation, the downlink data transmission scheduled by using the downlink control information; and the second device determines, according to a result of the decoding of the downlink data transmission scheduled by using the downlink control information, a hybrid automatic repeat request-acknowledgment corresponding to the downlink data transmission, and sends the determined hybrid automatic repeat request-acknowledgment corresponding to the downlink data transmission.

This step may further include: the second device determines, according to the hybrid automatic repeat request-acknowledgment subframe information in the downlink control information, the subframe of the hybrid automatic repeat request-acknowledgment corresponding to the downlink data transmission scheduled by using the downlink control information; and the second device sends, in the determined subframe of the hybrid automatic repeat request-acknowledgment, the hybrid automatic repeat request-acknowledgment corresponding to the downlink data transmission scheduled by using the downlink control information.

204. The first device receives the uplink information sent by the second device according to the downlink control information.

In this step, the first device receives the hybrid automatic repeat request-acknowledgment sent by the second device. The hybrid automatic repeat request-acknowledgment is a hybrid automatic repeat request-acknowledgment corresponding to the downlink data transmission scheduled by using the downlink control information.

In the method provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation, and/or the redundancy version corresponding to the at least one of the subframes used in the subframe aggregation, and/or the subframe types of the subframes used in the subframe aggregation, and perform corresponding processing. In this way, the quantity of the subframes used in the subframe aggregation and the redundancy versions of the subframes used in the subframe aggregation are dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S1 can be flexibly configured according to an actual situation, and system performance is improved by using the S1 subframes while GP overheads are proper.

Figure 4:
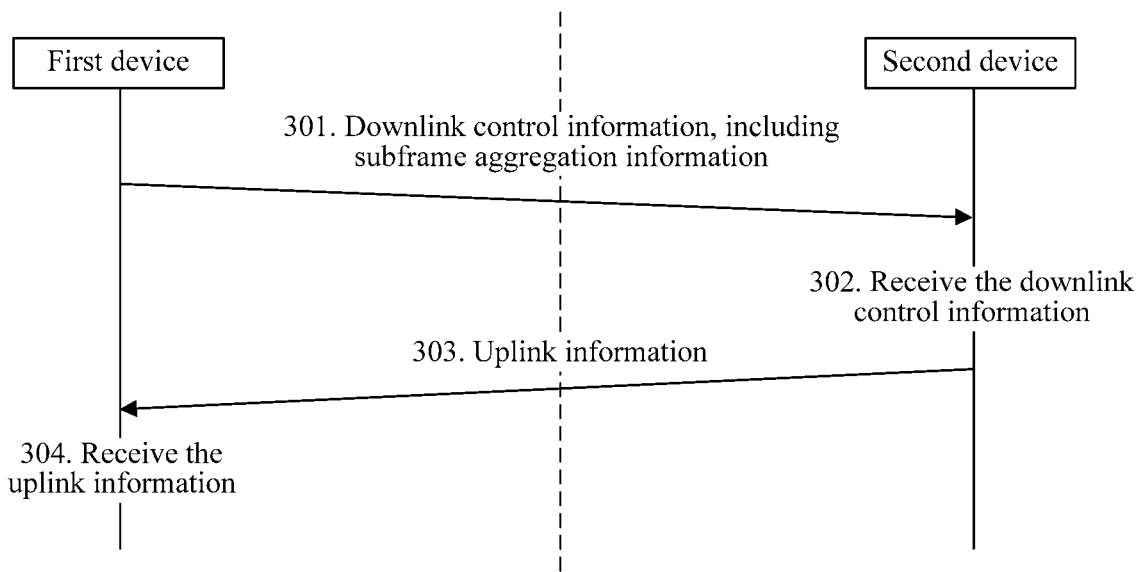
FIG. 4 is a schematic flowchart of an information transmission method according to another embodiment of the present disclosure.

An embodiment of the present disclosure provides an information transmission method, applied to the foregoing communications system. For example, the method may be applied to an LTE system and an LTE-Advanced system. As shown in FIG. 4, the method includes the following steps.

301. A first device sends downlink control information to a second device, where the downlink control information includes subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation.

The subframe aggregation information in this embodiment of the present disclosure may be used by the first device to indicate, to the second device, a redundancy version corresponding to at least one of subframes used in the subframe aggregation. Alternatively, the subframe aggregation information may be used by the first device to indicate, to the second device, a redundancy version corresponding to at least one of subframes occupied by data transmission scheduled by using the downlink control information.

Further, optionally, the subframe aggregation information corresponds to the redundancy version in the downlink control information; or a redundancy version domain in a downlink control information format corresponding to the downlink control information is a subframe aggregation information field.

The downlink control information may be used to schedule downlink data transmission. In this case, uplink information in step 303 is a hybrid automatic repeat request-acknowledgment corresponding to the downlink data transmission.

Further, optionally, before step 301, this embodiment of the present disclosure further includes: the first device sends radio resource control signaling to the second device, where the radio resource control signaling is used to indicate the quantity of the subframes used in the subframe aggregation.

Alternatively, further, optionally, before step 301, this embodiment of the present disclosure may further include: the first device scrambles a cyclic redundancy check CRC of the downlink control information by using a radio network temporary identifier RNTI, where the RNTI indicates the quantity of the subframes used in the subframe aggregation, and different RNTIs correspond to different subframe quantities.

Further, optionally, before step 301, this embodiment of the present disclosure may further include:

the first device scrambles a cyclic redundancy check (CRC) of the downlink control information by using a radio network temporary identifier (RNTI), where the RNTI indicates a transmission time interval (TTI) length corresponding to a physical downlink shared channel scheduled by using the downlink control information, and different RNTIs correspond to different TTI lengths.

Further, optionally, before step 301, this embodiment of the present disclosure may further include:

the first device scrambles a cyclic redundancy check (CRC) of the downlink control information by using a radio network temporary identifier RNTI, where the RNTI indicates a hybrid automatic repeat request-acknowledgment timing corresponding to a physical downlink shared channel scheduled by using the downlink control information, and different RNTIs correspond to different hybrid automatic repeat request-acknowledgment timings.

Further, optionally, this embodiment of the present disclosure may further include:

the first device determines, based on the quantity of the subframes used in the subframe aggregation and a redundancy version corresponding to a first subframe in the subframes used in the subframe aggregation, redundancy versions corresponding to remaining subframes in the subframes used in the subframe aggregation, specifically including:

the first device uses, as a starting point, the redundancy version corresponding to the first subframe in the subframes used in the subframe aggregation, and obtains X redundancy versions in a sequential order of redundancy versions 0, 2, 3, and 1 in a cyclic repetition manner, where X is equal to the quantity of the subframes used in the subframe aggregation, and the X redundancy versions are in a one-to-one correspondence to the subframes used in the subframe aggregation; and the first device sends, to the second device according to the determined redundancy versions corresponding to the subframes used in the subframe aggregation, the downlink data transmission scheduled by using the downlink control information.

302. The second device receives the downlink control information sent by the first device, where the downlink control information includes the subframe aggregation information.

A description of the subframe aggregation information is similar to that in step 301. Details are not described herein again.

Further, optionally, before step 302, this embodiment of the present disclosure may further include: the second device receives the radio resource control signaling sent by the first device, and the second device determines, according to the radio resource control signaling, the quantity of the subframes used in the subframe aggregation.

Alternatively, further, optionally, before step 302, this embodiment of the present disclosure may further include: the second device determines, according to a radio network temporary identifier (RNTI) used to scramble a cyclic redundancy check (CRC) of the downlink control information, the quantity of the subframes used in the subframe aggregation, where different RNTIs correspond to different subframe quantities.

Further, optionally, after step 302, this embodiment of the present disclosure may further include:

the second device determines, according to a radio network temporary identifier RNTI used to scramble a cyclic redundancy check (CRC) of the downlink control information, a transmission time interval (TTI) length corresponding to a physical downlink shared channel scheduled by using the downlink control information, where different RNTIs correspond to different TTI lengths.

Alternatively, further, optionally, after step 302, this embodiment of the present disclosure may further include:

the second device determines, according to a radio network temporary identifier (RNTI) used to scramble a cyclic redundancy check (CRC) of the downlink control information, a hybrid automatic repeat request-acknowledgment timing corresponding to a physical downlink shared channel scheduled by using the downlink control information, where different RNTIs correspond to different hybrid automatic repeat request-acknowledgment timings.

In this step, the quantity of the subframes used in the subframe aggregation is indicated by using the RRC signaling or the RNTI, thereby reducing load of the downlink control information, and improving transmission reliability of the downlink control information.

303. The second device sends uplink information according to the downlink control information received in step 302.

In this step, the uplink information may be a hybrid automatic repeat request-acknowledgment corresponding to the downlink data transmission.

Further, this step may further include:

the second device determines, based on the quantity of the subframes used in the subframe aggregation and a redundancy version corresponding to a first subframe in the subframes used in the subframe aggregation, redundancy versions corresponding to remaining subframes in the subframes used in the subframe aggregation, specifically including:

the second device, uses as a starting point, the redundancy version corresponding to the first subframe in the subframes used in the subframe aggregation, and obtains X redundancy versions in a sequential order of redundancy versions 0, 2, 3, and 1 in a cyclic repetition manner, where X is equal to the quantity of the subframes used in the subframe aggregation, and the X redundancy versions are in a one-to-one correspondence to the subframes used in the subframe aggregation. For example, when the quantity of the subframes used in the subframe aggregation is four, and the redundancy version corresponding to the first subframe is 3, redundancy versions of the four subframes used in the subframe aggregation are sequentially 3, 1, 0, and 2.

Further, this step may be:

the second device decodes, according to the determined quantity of the subframes used in the subframe aggregation and the determined redundancy versions of the subframes used in the subframe aggregation, the downlink data transmission scheduled by using the downlink control information; and the second device determines, according to a result of the decoding of the downlink data transmission scheduled by using the downlink control information, a hybrid automatic repeat request-acknowledgment corresponding to the downlink data transmission, and sends the determined hybrid automatic repeat request-acknowledgment corresponding to the downlink data transmission.

304. The first device receives the uplink information sent by the second device according to the downlink control information.

In this step, the first device receives the hybrid automatic repeat request-acknowledgment sent by the second device. The hybrid automatic repeat request-acknowledgment is a hybrid automatic repeat request-acknowledgment corresponding to the downlink data transmission scheduled by using the downlink control information.

In the method provided in this embodiment of the present disclosure, the first device sends the downlink control information to the second device, where the downlink control information includes the subframe aggregation information, so that the second device can obtain, according to the subframe aggregation information, the redundancy version corresponding to the at least one of the subframes used in the subframe aggregation. The first device sends the RRC signaling to the second device, to indicate the quantity of the subframes used in the subframe aggregation, so that the second device obtains the quantity of the subframes used in the subframe aggregation, and performs corresponding processing. In this way, a service delay is reduced while data transmission reliability is ensured.

Figure 5:
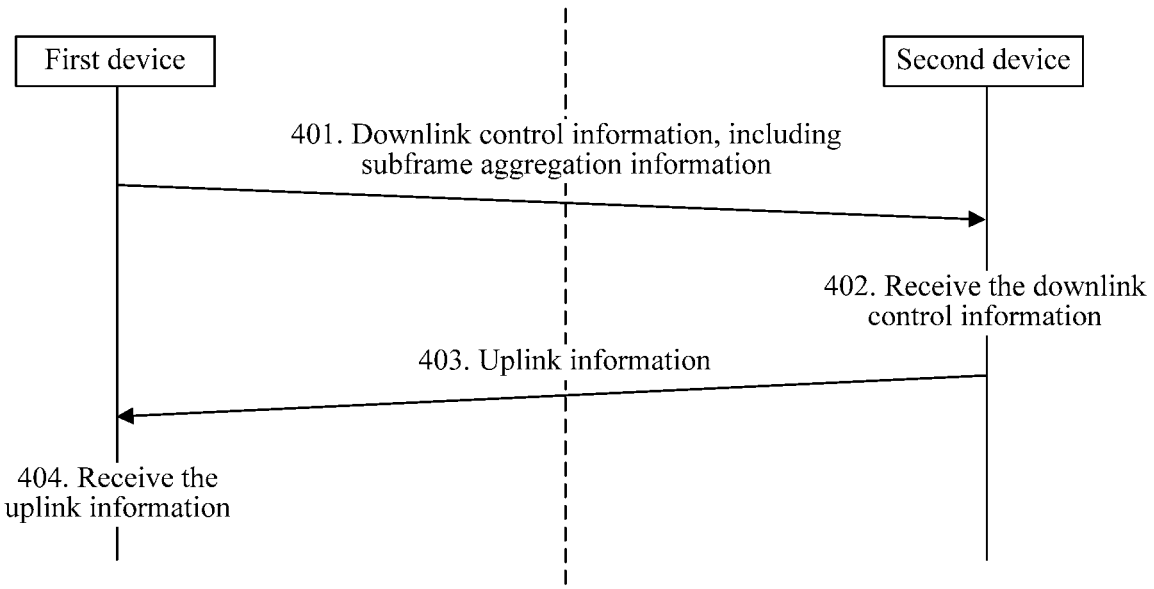
FIG. 5 is a schematic flowchart of an information transmission method according to another embodiment of the present disclosure.

An embodiment of the present disclosure provides an information transmission method, applied to the foregoing communications system. For example, the method may be applied to an LTE system and an LTE-Advanced system. As shown in FIG. 5, the method includes the following steps.

401. A first device sends downlink control information to a second device, where the downlink control information includes subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation.

The subframe aggregation information in this embodiment of the present disclosure may be used by the first device to indicate, to the second device, a quantity of subframes used in the subframe aggregation and a redundancy version corresponding to at least one of subframes used in the subframe aggregation. Alternatively, the subframe aggregation information may be used by the first device to indicate, to the second device, a quantity of subframes occupied by data transmission scheduled by using the downlink control information and a redundancy version corresponding to at least one of subframes occupied by data transmission scheduled by using the downlink control information.

The downlink control information may be used to schedule uplink data transmission. In this case, uplink information in step 403 is uplink data scheduled by using the downlink control information.

Further, a subframe aggregation information field in a downlink control information format corresponding to the downlink control information occupies two information bits. This may be specifically:

when a value corresponding to the subframe aggregation information field is 00, the quantity of the subframes used in the subframe aggregation is one, and a redundancy version corresponding to a first subframe in the subframes used in the subframe aggregation is indicated by a modulation and coding scheme and a redundancy version domain in the downlink control information format;

when a value corresponding to the subframe aggregation information field is 01, the quantity of the subframes used in the subframe aggregation is two, a redundancy version corresponding to a first subframe in the subframes used in the subframe aggregation is 0, and a redundancy version corresponding to a second subframe in the subframes used in the subframe aggregation is 2;

when a value corresponding to the subframe aggregation information field is 10, the quantity of the subframes used in the subframe aggregation is two, a redundancy version corresponding to a first subframe in the subframes used in the subframe aggregation is 3, and a redundancy version corresponding to a second subframe in the subframes used in the subframe aggregation is 1; or when a value corresponding to the subframe aggregation information field is 11, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to a third subframe in the subframes used in the subframe aggregation is 3, and a redundancy version corresponding to a fourth subframe in the subframes used in the subframe aggregation is 1.

In this step, the quantity of the subframes used in the subframe aggregation is dynamically indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

402. The second device receives the downlink control information sent by the first device, where the downlink control information includes the subframe aggregation information.

A description of the subframe aggregation information is similar to that in step 401. Details are not described herein again.

403. The second device sends uplink information according to the downlink control information received in step 402.

In this step, the downlink control information is used to schedule uplink data transmission, and the uplink information is uplink data scheduled by using the uplink control information.

Further, this step may be:

the second device determines, according to the subframe aggregation information, the quantity of the subframes used in the subframe aggregation and the redundancy version corresponding to the at least one of the subframes used in the subframe aggregation;

the second device encodes, according to the determined quantity of the subframes used in the subframe aggregation and the determined redundancy version corresponding to the at least one of the subframes used in the subframe aggregation, the uplink data transmission scheduled by using the downlink control information; and the second device sends the uplink data.

404. The first device receives the uplink information sent by the second device according to the downlink control information.

In this step, the first device receives the uplink data sent by the second device.

In the method provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

Figure 6:
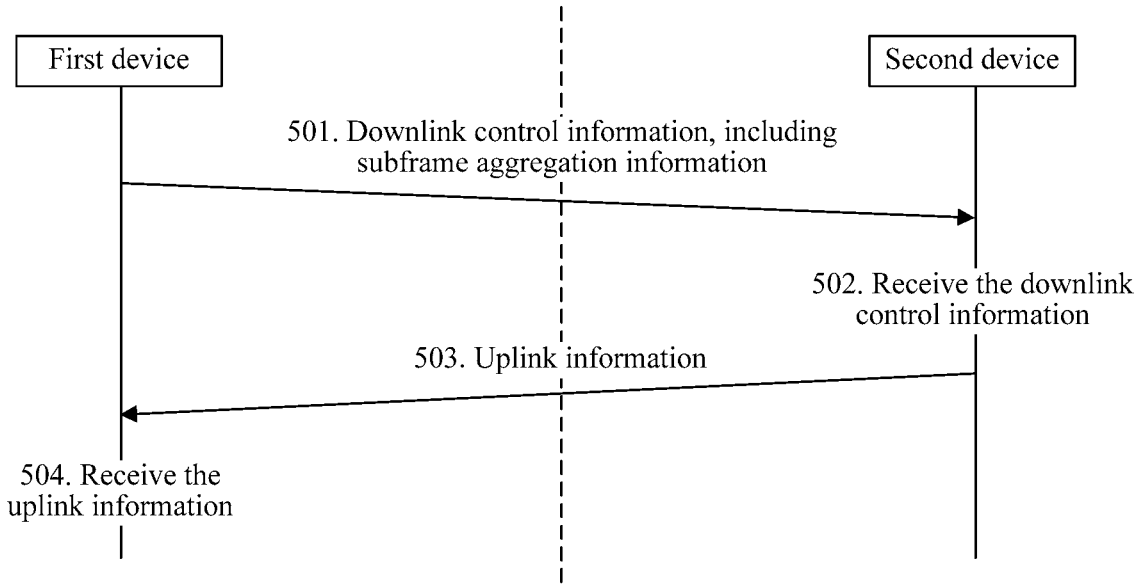
FIG. 6 is a schematic flowchart of an information transmission method according to another embodiment of the present disclosure.

An embodiment of the present disclosure provides an information transmission method, applicable to an evolved TDD system, for example, a TDD-U system. As shown in FIG. 6, the method includes the following steps.

501. A first device sends downlink control information to a second device, where the downlink control information includes subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation.

The subframe aggregation information in this embodiment of the present disclosure may be used by the first device to indicate, to the second device, a quantity of subframes used in the subframe aggregation and a redundancy version corresponding to at least one of subframes used in the subframe aggregation. Alternatively, the subframe aggregation information may be used by the first device to indicate, to the second device, a quantity of subframes occupied by data transmission scheduled by using the downlink control information and a redundancy version corresponding to at least one of subframes occupied by data transmission scheduled by using the downlink control information.

The downlink control information may be used to schedule uplink data transmission. In this case, uplink information in step 503 is uplink data scheduled by using the downlink control information.

Further, optionally, the subframe aggregation information in this embodiment of the present disclosure is further used to indicate subframe types of the subframes used in the subframe aggregation. The subframe type includes a second subframe type. Subframes corresponding to the second subframe type include a time domain symbol used for downlink transmission, a guard period GP, and a time domain symbol used for uplink transmission. A quantity of time domain symbols used for downlink transmission is less than a quantity of time domain symbols used for uplink transmission.

The time domain symbol used for downlink transmission may be used for downlink control information transmission, and/or reference signal and/or downlink data transmission.

Further, optionally, a subframe aggregation information field in a downlink control information format corresponding to the downlink control information in this embodiment of the present disclosure occupies three information bits. This may be specifically:

when a value corresponding to the subframe aggregation information field is 000, the quantity of the subframes used in the subframe aggregation is one, a redundancy version corresponding to a first subframe in the subframes used in the subframe aggregation is indicated by a modulation and coding scheme and a redundancy version domain in the downlink control information format, and a subframe type of the first subframe in the subframes used in the subframe aggregation is uplink subframe;

when a value corresponding to the subframe aggregation information field is 001, the quantity of the subframes used in the subframe aggregation is one, a redundancy version corresponding to a first subframe in the subframes used in the subframe aggregation is indicated by a modulation and coding scheme and a redundancy version domain in the downlink control information format, and a subframe type of the first subframe in the subframes used in the subframe aggregation is a second subframe type;

when a value corresponding to the subframe aggregation information field is 010, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both uplink subframe;

when a value corresponding to the subframe aggregation information field is 011, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, a subframe type of the first subframe in the subframes used in the subframe aggregation is a second subframe type, and a subframe type of the second subframe in the subframes used in the subframe aggregation is uplink subframe;

when a value corresponding to the subframe aggregation information field is 100, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both uplink subframe;

when a value corresponding to the subframe aggregation information field is 101, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, a subframe type of the first subframe in the subframes used in the subframe aggregation is a second subframe type, and a subframe type of the second subframe in the subframes used in the subframe aggregation is uplink subframe;

when a value corresponding to the subframe aggregation information field is 110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, subframe types of the second subframe, a third subframe, and a fourth subframe in the subframes used in the subframe aggregation are all uplink subframe, and a subframe type of the first subframe in the subframes used in the subframe aggregation is a second subframe type; or when a value corresponding to the subframe aggregation information field is 111, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, and subframe types of the first subframe, the second subframe, a third subframe, and a fourth subframe in the subframes used in the subframe aggregation are all a second subframe type.

Further, optionally, the downlink control information includes hybrid automatic repeat request-acknowledgment subframe information. The hybrid automatic repeat request-acknowledgment subframe information is used to indicate a subframe of the hybrid automatic repeat request-acknowledgment corresponding to the uplink data transmission scheduled by using the downlink control information.

In this step, the quantity of the subframes used in the subframe aggregation and the redundancy version are indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S2 can be flexibly configured according to an actual situation, and system performance is improved by using the S2 subframes while GP overheads are proper.

502. The second device receives the downlink control information sent by the first device, where the downlink control information includes the subframe aggregation information.

A description of the subframe aggregation information is similar to that in step 501. Details are not described herein again.

503. The second device sends uplink information according to the downlink control information received in step 502.

In this step, the downlink control information is used to schedule uplink data transmission, and the uplink information is uplink data scheduled by using the uplink control information.

Further, this step may be:

the second device determines, according to the subframe aggregation information, the quantity of the subframes used in the subframe aggregation, the redundancy version corresponding to the at least one of the subframes used in the subframe aggregation, and the subframe types of the subframes used in the subframe aggregation;

the second device encodes, according to the determined quantity of the subframes used in the subframe aggregation, the determined redundancy version corresponding to the at least one of the subframes used in the subframe aggregation, and the determined subframe types of the subframes used in the subframe aggregation, the uplink data transmission scheduled by using the downlink control information; and the second device sends the uplink data scheduled by using the downlink control information.

504. The first device receives the uplink information sent by the second device according to the downlink control information.

In this step, the first device receives the uplink data sent by the second device.

In the method provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation, the redundancy version corresponding to the at least one of the subframes used in the subframe aggregation, and the subframe types of the subframes used in the subframe aggregation, and perform corresponding processing. In this way, the quantity of the subframes used in the subframe aggregation and the redundancy versions of the subframes used in the subframe aggregation are dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S1 can be flexibly configured according to an actual situation, and system performance is improved by using the S1 subframes while GP overheads are proper.

Figure 7:
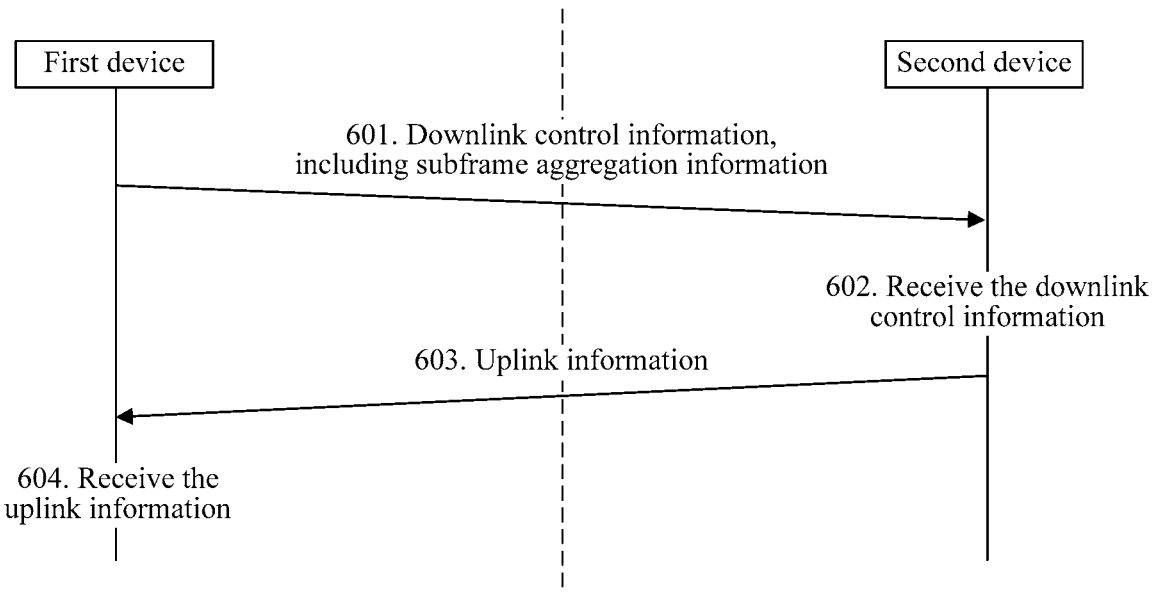
FIG. 7 is a schematic flowchart of an information transmission method according to another embodiment of the present disclosure.

An embodiment of the present disclosure provides an information transmission method, applied to the foregoing communications system. For example, the method may be applied to an LTE system and an LTE-Advanced system. As shown in FIG. 7, the method includes the following steps.

601. A first device sends downlink control information to a second device, where the downlink control information includes subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation. Specifically, coded bits corresponding to the transport block are jointly determined by resources corresponding to the plurality of subframes.

The subframe aggregation information in this embodiment of the present disclosure may be used by the first device to indicate, to the second device, a quantity of subframes used in the subframe aggregation and/or subframe types of subframes used in the subframe aggregation. Alternatively, the subframe aggregation information may be used by the first device to indicate, to the second device, a quantity of subframes occupied by data transmission scheduled by using the downlink control information and/or subframe types of subframes used in the subframe aggregation.

The downlink control information may be used to schedule downlink data transmission.

In this case, uplink information in step 603 is a hybrid automatic repeat request-acknowledgment corresponding to the downlink data transmission.

The downlink control information may be used to schedule uplink data transmission. In this case, uplink information in step 603 is uplink data scheduled by using the downlink control information.

Further, optionally, a subframe aggregation information field in a downlink control information format corresponding to the downlink control information occupies two information bits. The 2-bit subframe aggregation information may be used to indicate the quantity of the subframes used in the subframe aggregation. This may be specifically:

when a value corresponding to the subframe aggregation information field is 00, the quantity of the subframes used in the subframe aggregation is one; or when a value corresponding to the subframe aggregation information field is 01, the quantity of the subframes used in the subframe aggregation is two; or when a value corresponding to the subframe aggregation information field is 10, the quantity of the subframes used in the subframe aggregation is three; or when a value corresponding to the subframe aggregation information field is 11, the quantity of the subframes used in the subframe aggregation is four.

Further, optionally, a last subframe in the subframes used in the subframe aggregation is a first subframe type or a second subframe type. Descriptions of the first subframe type and the second subframe type are similar to those in Embodiment 2 and Embodiment 5. Details are not described herein again.

In this step, the quantity of the subframes used in the subframe aggregation is dynamically indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

602. The second device receives the downlink control information sent by the first device, where the downlink control information includes the subframe aggregation information.

A description of the subframe aggregation information is similar to that in step 601. Details are not described herein again.

603. The second device sends uplink information according to the downlink control information received in step 602.

In this step, the uplink information may be a hybrid automatic repeat request-acknowledgment corresponding to the downlink data transmission.

Further, this step may be:

the second device determines, according to the subframe aggregation information, the quantity of the subframes used in the subframe aggregation;

the second device decodes, according to the determined quantity of the subframes used in the subframe aggregation, the downlink data transmission scheduled by using the downlink control information; and the second device determines, according to a result of the decoding of the downlink data transmission scheduled by using the downlink control information, a hybrid automatic repeat request-acknowledgment corresponding to the downlink data transmission, and sends the determined hybrid automatic repeat request-acknowledgment corresponding to the downlink data transmission.

In this step, the downlink control information may be alternatively used to schedule uplink data transmission, and the uplink information is uplink data scheduled by using the uplink control information.

Further, this step may be:

the second device determines, according to the subframe aggregation information, the quantity of the subframes used in the subframe aggregation;

the second device encodes, according to the determined quantity of the subframes used in the subframe aggregation, the uplink data transmission scheduled by using the downlink control information; and the second device sends the uplink data scheduled by using the downlink control information.

604. The first device receives the uplink information sent by the second device according to the downlink control information.

In this step, the first device receives the hybrid automatic repeat request-acknowledgment sent by the second device. The hybrid automatic repeat request-acknowledgment is a hybrid automatic repeat request-acknowledgment corresponding to the downlink data transmission scheduled by using the downlink control information. This step may further be: The first device receives the uplink data sent by the second device.

In the method provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and/or the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, in this embodiment of the present disclosure, only the last subframe in the subframes used in the subframe aggregation is set to a subframe S1 or a subframe S2, thereby reducing GP overheads while ensuring system performance. Moreover, in this embodiment of the present disclosure, a plurality of subframes send a same redundancy version of a same transport block, so that data coverage can be increased.

Figure 8:
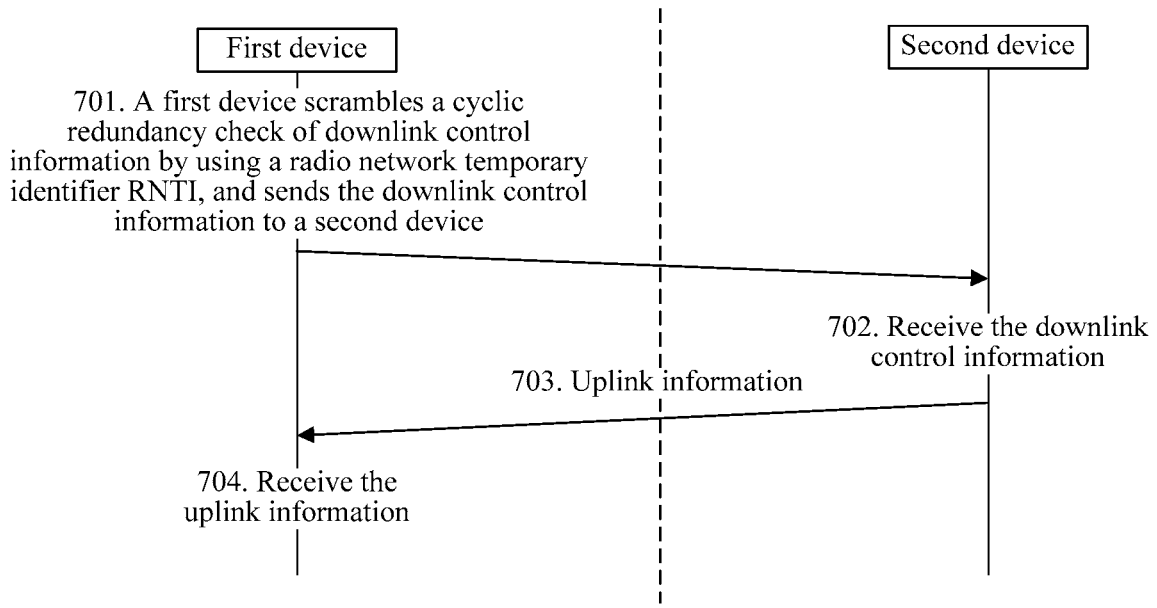
FIG. 8 is a schematic flowchart of an information transmission method according to another embodiment of the present disclosure.

An embodiment of the present disclosure provides an information transmission method, applied to the foregoing communications system. For example, the method may be applied to an LTE system and an LTE-Advanced system. As shown in FIG. 8, the method includes the following steps.

701. A first device scrambles a cyclic redundancy check (CRC) of downlink control information by using a radio network temporary identifier RNTI, and the first device sends the downlink control information to a second device.

The downlink control information may be used to schedule downlink data transmission. In this case, uplink information in step 703 is a hybrid automatic repeat request-acknowledgment corresponding to the downlink data transmission.

The downlink control information may be used to schedule uplink data transmission. In this case, uplink information in step 703 is uplink data scheduled by using the downlink control information.

Further, optionally, the RNTI indicates a transmission time interval TTI length corresponding to a physical downlink shared channel scheduled by using the downlink control information, and different RNTIs correspond to different TTI lengths. For example, if the RNTI is a first RNTI, the transmission time interval TTI length corresponding to the physical downlink shared channel scheduled by using the downlink control information is 1 ms. If the RNTI is a second RNTI, the transmission time interval TTI length corresponding to the physical downlink shared channel scheduled by using the downlink control information is two time domain symbols. This method is used to dynamically indicate a TTI length, to perform dynamic scheduling and indication according to a service requirement, so that a low-latency service can be rapidly transmitted. The RNTI is used for indication, so that load of the downlink control information is not increased, thereby improving transmission performance of the downlink control information.

Further, optionally, the RNTI indicates a hybrid automatic repeat request-acknowledgment timing corresponding to a physical downlink shared channel scheduled by using the downlink control information, and different RNTIs correspond to different hybrid automatic repeat request-acknowledgment timings. For example, if the RNTI is a first RNTI, the physical downlink shared channel scheduled by using the downlink control information corresponds to a first HARQ timing. If the RNTI is a second RNTI, the physical downlink shared channel scheduled by using the downlink control information corresponds to a second HARQ timing. This method is used to dynamically indicate different HARQ timings, and a short HARQ timing may be indicated for a low-latency service, thereby reducing a service delay; or a corresponding HARQ timing is indicated based on a UE capability, thereby enabling a system to use a short HARQ timing as much as possible, and improving system performance. The RNTI is used for indication, so that load of the downlink control information is not increased, thereby improving transmission performance of the downlink control information.

702. The second device receives the downlink control information sent by the first device.

This step may further include:
the second device determines, according to the radio network temporary identifier (RNTI) used to scramble the cyclic redundancy check (CRC) of the downlink control information, a transmission time interval TTI length corresponding to a physical downlink shared channel scheduled by using the downlink control information, where different RNTIs correspond to different TTI lengths.

Alternatively, this step may further include:
the second device determines, according to the radio network temporary identifier RNTI used to scramble the cyclic redundancy check (CRC) of the downlink control information, a hybrid automatic repeat request-acknowledgment timing corresponding to a physical downlink shared channel scheduled by using the downlink control information, where different RNTIs correspond to different hybrid automatic repeat request-acknowledgment timings.

703. The second device sends uplink information according to the downlink control information received in step 702.

In this step, the uplink information may be a hybrid automatic repeat request-acknowledgment corresponding to the downlink data transmission.

Further, this step may be:
the second device decodes, according to the determined TTI length, the downlink data transmission scheduled by using the downlink control information; and the second device determines, according to a result of the decoding of the downlink data transmission scheduled by using the downlink control information, a hybrid automatic repeat request-acknowledgment corresponding to the downlink data transmission, and sends the determined hybrid automatic repeat request-acknowledgment corresponding to the downlink data transmission.

In this step, the uplink information may be a hybrid automatic repeat request-acknowledgment corresponding to the downlink data transmission.

Further, this step may be:

the second device determines, according to the HARQ timing determined in step 702, a subframe of the HARQ-ACK corresponding to the downlink data transmission scheduled by using the downlink control information; and the second device sends the HARQ-ACK.

In this step, the downlink control information may be alternatively used to schedule uplink data transmission, and the uplink information is uplink data scheduled by using the uplink control information.

Further, this step may be:

the second device encodes, according to the TTI length determined in step 702, the uplink data transmission scheduled by using the downlink control information; and the second device sends the uplink data scheduled by using the downlink control information.

704. The first device receives the uplink information sent by the second device according to the downlink control information.

In this step, the first device receives the hybrid automatic repeat request-acknowledgment sent by the second device. The hybrid automatic repeat request-acknowledgment is a hybrid automatic repeat request-acknowledgment (HARQ-ACK) corresponding to the downlink data transmission scheduled by using the downlink control information. This step may further be: The first device receives the uplink data sent by the second device.

In the method provided in this embodiment of the present disclosure, the first device sends the downlink control information to the second device, to indicate, by using the RNTI of the downlink control information, the hybrid automatic repeat request-acknowledgment timing corresponding to the physical downlink shared channel scheduled by using the downlink control information, so that different HARQ timings are dynamically indicated, and a short HARQ timing may be indicated for a low-latency service, thereby reducing a service delay; or a corresponding HARQ timing is indicated based on a UE capability, thereby enabling a system to use a short HARQ timing as much as possible, and improving system performance. The RNTI is used for indication, so that load of the downlink control information is not increased, thereby improving transmission performance of the downlink control information. Alternatively, in the method provided in this embodiment of the present disclosure, the first device sends the downlink control information to the second device, to indicate, by using the RNTI of the downlink control information, the transmission time interval TTI length corresponding to the physical downlink shared channel scheduled by using the downlink control information. In this way, the TTI length is dynamically indicated, to perform dynamic scheduling and indication according to a service requirement, so that a low-latency service can be rapidly transmitted. The RNTI is used for indication, so that load of the downlink control information is not increased, thereby improving transmission performance of the downlink control information.

Figure 9:
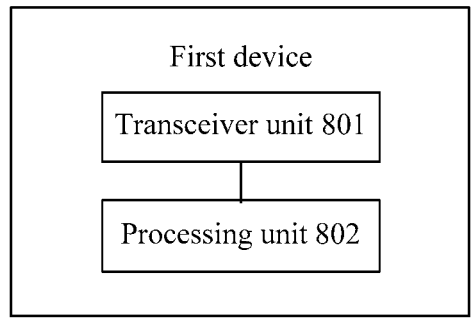
FIG. 9 is a schematic structural diagram of an information transmission apparatus according to an embodiment of the present disclosure.

Referring to FIG. 9, an embodiment of the present disclosure provides an apparatus, configured to implement the information transmission method provided in the foregoing embodiment. The apparatus may be a first device, including: a transceiver unit 801 and a processing unit 802.

The processing unit 802 is configured to generate downlink control information, where the downlink control information includes subframe aggregation information, and the subframe aggregation information is used by the first device to indicate, to a second device, a quantity of subframes used in subframe aggregation and/or a redundancy version corresponding to at least one of subframes used in subframe aggregation.

One subframe or a plurality of consecutive subframes are used for data transmission in the subframe aggregation. When a plurality of consecutive subframes are used in the subframe aggregation, different redundancy versions of one transport block (full name: Transport Block, TB) are transmitted by using the plurality of subframes used in the subframe aggregation.

The subframe aggregation information in this embodiment of the present disclosure may be used by the first device to indicate, to the second device, a quantity of subframes used in the subframe aggregation and/or a redundancy version corresponding to at least one of subframes used in the subframe aggregation. Alternatively, the subframe aggregation information may be used by the first device to indicate, to the second device, a quantity of subframes occupied by data transmission scheduled by using the downlink control information and/or a redundancy version corresponding to at least one of subframes occupied by data transmission scheduled by using the downlink control information.

The downlink control information may be used to schedule downlink data transmission. In this case, uplink information is a hybrid automatic repeat request-acknowledgment corresponding to the downlink data transmission.

Further, a subframe aggregation information field in a downlink control information format corresponding to the downlink control information occupies three information bits. The 3-bit subframe aggregation information may be used to indicate the quantity of the subframes used in the subframe aggregation and the redundancy version corresponding to at least one of the subframes used in the subframe aggregation. This may be specifically:

when a value corresponding to the subframe aggregation information field is 000, the quantity of the subframes used in the subframe aggregation is one, and a redundancy version corresponding to a first subframe in the subframes used in the subframe aggregation is 0;

when a value corresponding to the subframe aggregation information field is 001, the quantity of the subframes used in the subframe aggregation is one, and a redundancy version corresponding to a first subframe in the subframes used in the subframe aggregation is 1;

when a value corresponding to the subframe aggregation information field is 010, the quantity of the subframes used in the subframe aggregation is one, and a redundancy version corresponding to a first subframe in the subframes used in the subframe aggregation is 2;

when a value corresponding to the subframe aggregation information field is 011, the quantity of the subframes used in the subframe aggregation is one, and a redundancy version corresponding to a first subframe in the subframes used in the subframe aggregation is 3;

when a value corresponding to the subframe aggregation information field is 100, the quantity of the subframes used in the subframe aggregation is two, a redundancy version corresponding to a first subframe in the subframes used in the subframe aggregation is 0, and a redundancy version corresponding to a second subframe in the subframes used in the subframe aggregation is 2;

when a value corresponding to the subframe aggregation information field is 101, the quantity of the subframes used in the subframe aggregation is two, a redundancy version corresponding to a first subframe in the subframes used in the subframe aggregation is 3, and a redundancy version corresponding to a second subframe in the subframes used in the subframe aggregation is 1;

when a value corresponding to the subframe aggregation information field is 110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to a third subframe in the subframes used in the subframe aggregation is 3, and a redundancy version corresponding to a fourth subframe in the subframes used in the subframe aggregation is 1; or when a value corresponding to the subframe aggregation information field is 111, the quantity of the subframes used in the subframe aggregation is three, a redundancy version corresponding to a first subframe in the subframes used in the subframe aggregation is 0, a redundancy version corresponding to a second subframe in the subframes used in the subframe aggregation is 2, and a redundancy version corresponding to a third subframe in the subframes used in the subframe aggregation is 3; or when a value corresponding to the subframe aggregation information field is 111, no definition is provided, and it is in a reserved state.

Further, the three information bits occupied by the subframe aggregation information field may include a 2-bit redundancy version and one newly added bit in an existing downlink control information format.

The quantity of the subframes used in the subframe aggregation is dynamically indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

Moreover, in this embodiment of the present disclosure, the quantity of the subframes used in the subframe aggregation and the redundancy versions of the used subframes are jointly indicated by using the subframe aggregation information field, so that typical combined indication is implemented by using only three information bits. This, compared with a case in which two bits are used to indicate the quantity of the subframes used in the subframe aggregation and two bits are used to indicate the redundancy versions, reduces bit overheads, reduces load of the downlink control information, and improves transmission reliability of the downlink control information.

The transceiver unit 801 is configured to: send the downlink control information to the second device, and receive uplink information sent by the second device according to the downlink control information.

The transceiver unit 801 receives a hybrid automatic repeat request-acknowledgment sent by the second device. The hybrid automatic repeat request-acknowledgment is a hybrid automatic repeat request-acknowledgment (HARQ-ACK) corresponding to the downlink data transmission scheduled by using the downlink control information.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and/or the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

Specifically, the first device is applicable to an evolved TDD system, for example, a TDD-U system.

The processing unit 802 is further configured to generate downlink control information, where the downlink control information includes subframe aggregation information. The transceiver unit 801 is further configured to send the downlink control information to the second device.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation.

The subframe aggregation information in this embodiment of the present disclosure may be used by the first device to indicate, to the second device, a quantity of subframes used in the subframe aggregation and/or a redundancy version corresponding to at least one of subframes used in the subframe aggregation. Alternatively, the subframe aggregation information may be used by the first device to indicate, to the second device, a quantity of subframes occupied by data transmission scheduled by using the downlink control information and/or a redundancy version corresponding to at least one of subframes occupied by data transmission scheduled by using the downlink control information.

The downlink control information may be used to schedule downlink data transmission. In this case, uplink information is a hybrid automatic repeat request-acknowledgment corresponding to the downlink data transmission.

Further, optionally, the subframe aggregation information in this embodiment of the present disclosure is further used to indicate subframe types of the subframes used in the subframe aggregation. The subframe type includes a first subframe type. Subframes corresponding to the first subframe type include a time domain symbol used for downlink transmission, a guard period GP, and a time domain symbol used for uplink transmission. A quantity of time domain symbols used for downlink transmission is greater than or equal to a quantity of time domain symbols used for uplink transmission. The time domain symbol used for uplink transmission may be used for uplink control information transmission, and/or sounding reference signal SRS transmission, and/or uplink data transmission.

Further, optionally, in this embodiment of the present disclosure, a subframe aggregation information field in a downlink control information format corresponding to the downlink control information occupies four information bits. The 4-bit subframe aggregation information may be used to indicate the quantity of the subframes used in the subframe aggregation, the redundancy version corresponding to the at least one of the subframes used in the subframe aggregation, and the subframe types of the subframes used in the subframe aggregation. This may be specifically:

when a value corresponding to the subframe aggregation information field is 0000, the quantity of the subframes used in the subframe aggregation is one, a redundancy version corresponding to a first subframe in the subframes used in the subframe aggregation is 0, and a subframe type of the first subframe in the subframes used in the subframe aggregation is downlink subframe;

when a value corresponding to the subframe aggregation information field is 0001, the quantity of the subframes used in the subframe aggregation is one, a redundancy version corresponding to a first subframe in the subframes used in the subframe aggregation is 0, and a subframe type of the first subframe in the subframes used in the subframe aggregation is a first subframe type;

when a value corresponding to the subframe aggregation information field is 0010, the quantity of the subframes used in the subframe aggregation is one, a redundancy version corresponding to a first subframe in the subframes used in the subframe aggregation is 1, and a subframe type of the first subframe in the subframes used in the subframe aggregation is downlink subframe;

when a value corresponding to the subframe aggregation information field is 0011, the quantity of the subframes used in the subframe aggregation is one, a redundancy version corresponding to a first subframe in the subframes used in the subframe aggregation is 1, and a subframe type of the first subframe in the subframes used in the subframe aggregation is a first subframe type;

when a value corresponding to the subframe aggregation information field is 0100, the quantity of the subframes used in the subframe aggregation is one, a redundancy version corresponding to a first subframe in the subframes used in the subframe aggregation is 2, and a subframe type of the first subframe in the subframes used in the subframe aggregation is downlink subframe;

when a value corresponding to the subframe aggregation information field is 0101, the quantity of the subframes used in the subframe aggregation is one, a redundancy version corresponding to a first subframe in the subframes used in the subframe aggregation is 2, and a subframe type of the first subframe in the subframes used in the subframe aggregation is a first subframe type;

when a value corresponding to the subframe aggregation information field is 0110, the quantity of the subframes used in the subframe aggregation is one, a redundancy version corresponding to a first subframe in the subframes used in the subframe aggregation is 3, and a subframe type of the first subframe in the subframes used in the subframe aggregation is downlink subframe;

when a value corresponding to the subframe aggregation information field is 0111, the quantity of the subframes used in the subframe aggregation is one, a redundancy version corresponding to a first subframe in the subframes used in the subframe aggregation is 3, and a subframe type of the first subframe in the subframes used in the subframe aggregation is a first subframe type;

when a value corresponding to the subframe aggregation information field is 1000, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both downlink subframe;

when a value corresponding to the subframe aggregation information field is 1001, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, a subframe type of the first subframe in the subframes used in the subframe aggregation is downlink subframe, and a subframe type of the second subframe in the subframes used in the subframe aggregation is a first subframe type;

when a value corresponding to the subframe aggregation information field is 1010, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both a first subframe type;

when a value corresponding to the subframe aggregation information field is 1011, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both downlink subframe;

when a value corresponding to the subframe aggregation information field is 1100, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, a subframe type of the first subframe in the subframes used in the subframe aggregation is downlink subframe, and a subframe type of the second subframe in the subframes used in the subframe aggregation is a first subframe type;

when a value corresponding to the subframe aggregation information field is 1101, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both a first subframe type;

when a value corresponding to the subframe aggregation information field is 1110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, subframe types of the first subframe, the second subframe, and a third subframe in the subframes used in the subframe aggregation are all downlink subframe, and a subframe type of a fourth subframe in the subframes used in the subframe aggregation is a first subframe type; or when a value corresponding to the subframe aggregation information field is 1111, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, and subframe types of the first subframe, the second subframe, a third subframe, and a fourth subframe in the subframes used in the subframe aggregation are all a first subframe type.

Further, optionally, the downlink control information includes hybrid automatic repeat request-acknowledgment subframe information. The hybrid automatic repeat request-acknowledgment subframe information is used to indicate a subframe of the hybrid automatic repeat request-acknowledgment corresponding to the downlink data transmission scheduled by using the downlink control information.

Further, the four information bits occupied by the subframe aggregation information field may include a 2-bit redundancy version and two newly added bits in an existing downlink control information format.

The quantity of the subframes used in the subframe aggregation and the redundancy version are indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S1 can be flexibly configured according to an actual situation, and system performance is improved by using the S1 subframes while GP overheads are proper.

Moreover, in this embodiment of the present disclosure, the quantity of the subframes used in the subframe aggregation, the redundancy versions of the used subframes, and the subframe types of the used subframes are jointly indicated by using the subframe aggregation information field, so that typical combined indication is implemented by using only four information bits. This, compared with a case in which two bits are used to indicate the quantity of the subframes used in the subframe aggregation, two bits are used to indicate the redundancy versions, and two bits are used to indicate the subframe types, reduces bit overheads, reduces load of the downlink control information, and improves transmission reliability of the downlink control information.

The transceiver unit 801 is specifically configured to receive the uplink information sent by the second device according to the downlink control information. The hybrid automatic repeat request-acknowledgment is a hybrid automatic repeat request-acknowledgment corresponding to the downlink data transmission scheduled by using the downlink control information.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation, and/or the redundancy version corresponding to the at least one of the subframes used in the subframe aggregation, and/or the subframe types of the subframes used in the subframe aggregation, and perform corresponding processing. In this way, the quantity of the subframes used in the subframe aggregation and the redundancy versions of the subframes used in the subframe aggregation are dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S1 can be flexibly configured according to an actual situation, and system performance is improved by using the S1 subframes while GP overheads are proper.

Specifically, the first device is applicable to the foregoing communications system, for example, applicable to an LTE system and an LTE-Advanced system. The transceiver unit 801 is specifically configured to send the downlink control information to the second device, where the downlink control information includes the subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation.

The subframe aggregation information in this embodiment of the present disclosure may be used by the first device to indicate, to the second device, a redundancy version corresponding to at least one of subframes used in the subframe aggregation. Alternatively, the subframe aggregation information may be used by the first device to indicate, to the second device, a redundancy version corresponding to at least one of subframes occupied by data transmission scheduled by using the downlink control information.

Further, optionally, the subframe aggregation information corresponds to the redundancy version in the downlink control information; or a redundancy version domain in a downlink control information format corresponding to the downlink control information is the subframe aggregation information field.

The downlink control information may be used to schedule downlink data transmission. In this case, uplink information is a hybrid automatic repeat request-acknowledgment corresponding to the downlink data transmission.

Further, optionally, the transceiver unit 801 is further configured to send radio resource control signaling to the second device, where the radio resource control signaling is used to indicate the quantity of the subframes used in the subframe aggregation.

Alternatively, further, optionally, the processing unit 802 is further configured to scramble a cyclic redundancy check (CRC) of the downlink control information by using a radio network temporary identifier (RNTI), where the RNTI indicates the quantity of the subframes used in the subframe aggregation, and different RNTIs correspond to different subframe quantities.

Further, optionally, the processing unit 802 is further configured to:

scramble a cyclic redundancy check (CRC) of the downlink control information by using a radio network temporary identifier (RNTI), where the RNTI indicates a transmission time interval TTI length corresponding to a physical downlink shared channel scheduled by using the downlink control information, and different RNTIs correspond to different TTI lengths.

Further, optionally, the processing unit 802 is further configured to:

scramble a cyclic redundancy check CRC of the downlink control information by using a radio network temporary identifier RNTI, where the RNTI indicates a hybrid automatic repeat request-acknowledgment timing corresponding to a physical downlink shared channel scheduled by using the downlink control information, and different RNTIs correspond to different hybrid automatic repeat request-acknowledgment timings.

Further, optionally, the processing unit 802 is further configured to:

determine, based on the quantity of the subframes used in the subframe aggregation and a redundancy version corresponding to a first subframe in the subframes used in the subframe aggregation, redundancy versions corresponding to remaining subframes in the subframes used in the subframe aggregation, specifically including:

using, as a starting point, the redundancy version corresponding to the first subframe in the subframes used in the subframe aggregation, and obtaining X redundancy versions in a sequential order of redundancy versions 0, 2, 3, and 1 in a cyclic repetition manner, where X is equal to the quantity of the subframes used in the subframe aggregation, and the X redundancy versions are in a one-to-one correspondence to the subframes used in the subframe aggregation; and sending, to the second device according to the determined redundancy versions corresponding to the subframes used in the subframe aggregation, the downlink data transmission scheduled by using the downlink control information.

The transceiver unit 801 is specifically configured to receive the uplink information sent by the second device according to the downlink control information.

The transceiver unit 801 receives the hybrid automatic repeat request-acknowledgment sent by the second device. The hybrid automatic repeat request-acknowledgment is a hybrid automatic repeat request-acknowledgment corresponding to the downlink data transmission scheduled by using the downlink control information.

According to the apparatus provided in this embodiment of the present disclosure, the first device sends the downlink control information to the second device, where the downlink control information includes the subframe aggregation information, so that the second device can obtain, according to the subframe aggregation information, the redundancy version corresponding to the at least one of the subframes used in the subframe aggregation. The first device sends the RRC signaling to the second device, to indicate the quantity of the subframes used in the subframe aggregation, so that the second device obtains the quantity of the subframes used in the subframe aggregation, and performs corresponding processing. In this way, a service delay is reduced while data transmission reliability is ensured.

Specifically, the first device is applied to the foregoing communications system, for example, applicable to an LTE system and an LTE-Advanced system. The transceiver unit 801 may be specifically configured to send the downlink control information to the second device, where the downlink control information includes the subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation.

The subframe aggregation information in this embodiment of the present disclosure may be used by the first device to indicate, to the second device, a quantity of subframes used in the subframe aggregation and/or a redundancy version corresponding to at least one of subframes used in the subframe aggregation. Alternatively, the subframe aggregation information may be used by the first device to indicate, to the second device, a quantity of subframes occupied by data transmission scheduled by using the downlink control information and/or a redundancy version corresponding to at least one of subframes occupied by data transmission scheduled by using the downlink control information.

The downlink control information may be used to schedule uplink data transmission. In this case, uplink information is uplink data scheduled by using the downlink control information.

Further, a subframe aggregation information field in a downlink control information format corresponding to the downlink control information occupies two information bits. This may be specifically:

when a value corresponding to the subframe aggregation information field is 00, the quantity of the subframes used in the subframe aggregation is one, and a redundancy version corresponding to a first subframe in the subframes used in the subframe aggregation is indicated by a modulation and coding scheme and a redundancy version domain in the downlink control information format;

when a value corresponding to the subframe aggregation information field is 01, the quantity of the subframes used in the subframe aggregation is two, a redundancy version corresponding to a first subframe in the subframes used in the subframe aggregation is 0, and a redundancy version corresponding to a second subframe in the subframes used in the subframe aggregation is 2;

when a value corresponding to the subframe aggregation information field is 10, the quantity of the subframes used in the subframe aggregation is two, a redundancy version corresponding to a first subframe in the subframes used in the subframe aggregation is 3, and a redundancy version corresponding to a second subframe in the subframes used in the subframe aggregation is 1; or when a value corresponding to the subframe aggregation information field is 11, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to a third subframe in the subframes used in the subframe aggregation is 3, and a redundancy version corresponding to a fourth subframe in the subframes used in the subframe aggregation is 1.

The quantity of the subframes used in the subframe aggregation is dynamically indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

The transceiver unit 801 may be specifically configured to receive the uplink information sent by the second device according to the downlink control information.

The transceiver unit 801 receives uplink data sent by the second device.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and/or the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

Specifically, the first device is applied to an evolved TDD system, for example, a TDD-U system. The transceiver unit 801 may be specifically configured to send the downlink control information to the second device, where the downlink control information includes the subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation.

The subframe aggregation information in this embodiment of the present disclosure may be used by the first device to indicate, to the second device, a quantity of subframes used in the subframe aggregation and/or a redundancy version corresponding to at least one of subframes used in the subframe aggregation. Alternatively, the subframe aggregation information may be used by the first device to indicate, to the second device, a quantity of subframes occupied by data transmission scheduled by using the downlink control information and/or a redundancy version corresponding to at least one of subframes occupied by data transmission scheduled by using the downlink control information.

The downlink control information may be used to schedule uplink data transmission. In this case, uplink information is uplink data scheduled by using the downlink control information.

Further, optionally, the subframe aggregation information in this embodiment of the present disclosure is further used to indicate subframe types of the subframes used in the subframe aggregation. The subframe type includes a second subframe type. Subframes corresponding to the second subframe type include a time domain symbol used for downlink transmission, a guard period GP, and a time domain symbol used for uplink transmission. A quantity of time domain symbols used for downlink transmission is less than a quantity of time domain symbols used for uplink transmission. The time domain symbol used for downlink transmission may be used for downlink control information transmission, and/or reference signal and/or downlink data transmission.

Further, optionally, a subframe aggregation information field in a downlink control information format corresponding to the downlink control information in this embodiment of the present disclosure occupies three information bits. This may be specifically:

when a value corresponding to the subframe aggregation information field is 000, the quantity of the subframes used in the subframe aggregation is one, a redundancy version corresponding to a first subframe in the subframes used in the subframe aggregation is indicated by a modulation and coding scheme and a redundancy version domain in the downlink control information format, and a subframe type of the first subframe in the subframes used in the subframe aggregation is uplink subframe;

when a value corresponding to the subframe aggregation information field is 001, the quantity of the subframes used in the subframe aggregation is one, a redundancy version corresponding to a first subframe in the subframes used in the subframe aggregation is indicated by a modulation and coding scheme and a redundancy version domain in the downlink control information format, and a subframe type of the first subframe in the subframes used in the subframe aggregation is a second subframe type;

when a value corresponding to the subframe aggregation information field is 010, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, and subframe types of the first subframe and the second subframe in the subframes used in the subframe aggregation are both uplink subframe;

when a value corresponding to the subframe aggregation information field is 011, the quantity of the subframes used in the subframe aggregation is two, a redundancy version corresponding to a first subframe in the subframes used in the subframe aggregation is 0, a redundancy version corresponding to a second subframe in the subframes used in the subframe aggregation is 2, a subframe type of the first subframe in the subframes used in the subframe aggregation is a second subframe type, and a subframe type of the second subframe in the subframes used in the subframe aggregation is uplink subframe;

when a value corresponding to the subframe aggregation information field is 100, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, and subframe types of the first subframe and the second subframe in the subframes used in the subframe aggregation are both uplink subframe;

when a value corresponding to the subframe aggregation information field is 101, the quantity of the subframes used in the subframe aggregation is two, a redundancy version corresponding to a first subframe in the subframes used in the subframe aggregation is 3, a redundancy version corresponding to a second subframe in the subframes used in the subframe aggregation is 1, a subframe type of the first subframe in the subframes used in the subframe aggregation is a second subframe type, and a subframe type of the second subframe in the subframes used in the subframe aggregation is uplink subframe;

when a value corresponding to the subframe aggregation information field is 110, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, subframe types of the second subframe, a third subframe, and a fourth subframe in the subframes used in the subframe aggregation are all uplink subframe, and a subframe type of the first subframe in the subframes used in the subframe aggregation is a second subframe type; or when a value corresponding to the subframe aggregation information field is 111, the quantity of the subframes used in the subframe aggregation is four, a redundancy version corresponding to a first subframe in the subframes used in the subframe aggregation is 0, a redundancy version corresponding to a second subframe in the subframes used in the subframe aggregation is 2, a redundancy version corresponding to the first subframe in the subframes used in the subframe aggregation is 3, a redundancy version corresponding to the second subframe in the subframes used in the subframe aggregation is 1, and subframe types of the first subframe, the second subframe, a third subframe, and a fourth subframe in the subframes used in the subframe aggregation are all a second subframe type.

Further, optionally, the downlink control information includes hybrid automatic repeat request-acknowledgment subframe information. The hybrid automatic repeat request-acknowledgment subframe information is used to indicate a subframe of the hybrid automatic repeat request-acknowledgment corresponding to the uplink data transmission scheduled by using the downlink control information.

The quantity of the subframes used in the subframe aggregation and the redundancy version are indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S2 can be flexibly configured according to an actual situation, and system performance is improved by using the S2 subframes while GP overheads are proper.

The transceiver unit 801 may be specifically configured to receive the uplink information sent by the second device according to the downlink control information.

In this step, the transceiver unit 801 receives the uplink data sent by the second device.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation, and/or the redundancy version corresponding to the at least one of the subframes used in the subframe aggregation, and/or the subframe types of the subframes used in the subframe aggregation, and perform corresponding processing. In this way, the quantity of the subframes used in the subframe aggregation and the redundancy versions of the subframes used in the subframe aggregation are dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S1 can be flexibly configured according to an actual situation, and system performance is improved by using the S1 subframes while GP overheads are proper.

Specifically, the first device is applied to the foregoing communications system, for example, applicable to an LTE system and an LTE-Advanced system. The transceiver unit 801 may be specifically configured to send the downlink control information to the second device, where the downlink control information includes the subframe aggregation information.

One subframe or a plurality of consecutive subframes are used for data transmission in the subframe aggregation. When a plurality of consecutive subframes are used in the subframe aggregation, different redundancy versions of one transport block are transmitted by using the plurality of subframes used in the subframe aggregation. Specifically, coded bits corresponding to the transport block are jointly determined by resources corresponding to the plurality of subframes.

The subframe aggregation information in this embodiment of the present disclosure may be used by the first device to indicate, to the second device, a quantity of subframes used in the subframe aggregation and/or subframe types of subframes used in the subframe aggregation. Alternatively, the subframe aggregation information may be used by the first device to indicate, to the second device, a quantity of subframes occupied by data transmission scheduled by using the downlink control information and/or subframe types of subframes used in the subframe aggregation.

The downlink control information may be used to schedule downlink data transmission. In this case, uplink information is a hybrid automatic repeat request-acknowledgment corresponding to the downlink data transmission.

The downlink control information may be used to schedule uplink data transmission. In this case, uplink information is uplink data scheduled by using the downlink control information.

Further, optionally, a subframe aggregation information field in a downlink control information format corresponding to the downlink control information occupies two information bits. The 2-bit subframe aggregation information may be used to indicate the quantity of the subframes used in the subframe aggregation. This may be specifically:

when a value corresponding to the subframe aggregation information field is 00, the quantity of the subframes used in the subframe aggregation is one; or when a value corresponding to the subframe aggregation information field is 01, the quantity of the subframes used in the subframe aggregation is two; or when a value corresponding to the subframe aggregation information field is 10, the quantity of the subframes used in the subframe aggregation is three; or when a value corresponding to the subframe aggregation information field is 11, the quantity of the subframes used in the subframe aggregation is four.

Further, optionally, a last subframe in the subframes used in the subframe aggregation is a first subframe type or a second subframe type. Descriptions of the first subframe type and the second subframe type are similar to those in Embodiment 2 and Embodiment 5. Details are not described herein again.

The quantity of the subframes used in the subframe aggregation is dynamically indicated based on a channel condition by using the subframe aggregation information in the downlink control information, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

The transceiver unit 801 may be specifically configured to receive the uplink information sent by the second device according to the downlink control information.

The transceiver unit 801 receives the hybrid automatic repeat request-acknowledgment sent by the second device. The hybrid automatic repeat request-acknowledgment is a hybrid automatic repeat request-acknowledgment corresponding to the downlink data transmission scheduled by using the downlink control information. Alternatively, the transceiver unit 801 receives the uplink data sent by the second device.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and/or the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, in this embodiment of the present disclosure, only the last subframe in the subframes used in the subframe aggregation is set to a subframe S1 or a subframe S2, thereby reducing GP overheads while ensuring system performance. Moreover, in this embodiment of the present disclosure, a plurality of subframes send a same redundancy version of a same transport block, so that data coverage can be increased.

Specifically, the first device is applied to the foregoing communications system, for example, applicable to an LTE system and an LTE-Advanced system. The processing unit 802 may be specifically configured to scramble a cyclic redundancy check (CRC) of the downlink control information by using a radio network temporary identifier RNTI. The first device sends the downlink control information to the second device.

The downlink control information may be used to schedule downlink data transmission.

In this case, uplink information is a hybrid automatic repeat request-acknowledgment corresponding to the downlink data transmission.

The downlink control information may be used to schedule uplink data transmission. In this case, uplink information is uplink data scheduled by using the downlink control information.

Further, optionally, the RNTI indicates a transmission time interval TTI length corresponding to a physical downlink shared channel scheduled by using the downlink control information, and different RNTIs correspond to different TTI lengths. For example, if the RNTI is a first RNTI, the transmission time interval TTI length corresponding to the physical downlink shared channel scheduled by using the downlink control information is 1 ms. If the RNTI is a second RNTI, the transmission time interval TTI length corresponding to the physical downlink shared channel scheduled by using the downlink control information is two time domain symbols. This apparatus is used to dynamically indicate a TTI length, to perform dynamic scheduling and indication according to a service requirement, so that a low-latency service can be rapidly transmitted. The RNTI is used for indication, so that load of the downlink control information is not increased, thereby improving transmission performance of the downlink control information.

Further, optionally, the RNTI indicates a hybrid automatic repeat request-acknowledgment timing corresponding to a physical downlink shared channel scheduled by using the downlink control information, and different RNTIs correspond to different hybrid automatic repeat request-acknowledgment timings. For example, if the RNTI is a first RNTI, the physical downlink shared channel scheduled by using the downlink control information corresponds to a first HARQ timing. If the RNTI is a second RNTI, the physical downlink shared channel scheduled by using the downlink control information corresponds to a second HARQ timing. This apparatus is used to dynamically indicate different HARQ timings, and a short HARQ timing may be indicated for a low-latency service, thereby reducing a service delay; or a corresponding HARQ timing is indicated based on a UE capability, thereby enabling a system to use a short HARQ timing as much as possible, and improving system performance. The RNTI is used for indication, so that load of the downlink control information is not increased, thereby improving transmission performance of the downlink control information.

The transceiver unit 801 may be specifically configured to receive the uplink information sent by the second device according to the downlink control information.

The transceiver unit 801 receives the hybrid automatic repeat request-acknowledgment sent by the second device. The hybrid automatic repeat request-acknowledgment is a hybrid automatic repeat request-acknowledgment (HARQ-ACK) corresponding to the downlink data transmission scheduled by using the downlink control information. Alternatively, the transceiver unit 801 receives the uplink data sent by the second device.

In the method provided in this embodiment of the present disclosure, the first device sends the downlink control information to the second device, to indicate, by using the RNTI of the downlink control information, the hybrid automatic repeat request-acknowledgment timing corresponding to the physical downlink shared channel scheduled by using the downlink control information, so that different HARQ timings are dynamically indicated, and a short HARQ timing may be indicated for a low-latency service, thereby reducing a service delay; or a corresponding HARQ timing is indicated based on a UE capability, thereby enabling a system to use a short HARQ timing as much as possible, and improving system performance. The RNTI is used for indication, so that load of the downlink control information is not increased, thereby improving transmission performance of the downlink control information. Alternatively, in the method provided in this embodiment of the present disclosure, the first device sends the downlink control information to the second device, to indicate, by using the RNTI of the downlink control information, the transmission time interval TTI length corresponding to the physical downlink shared channel scheduled by using the downlink control information. In this way, the TTI length is dynamically indicated, to perform dynamic scheduling and indication according to a service requirement, so that a low-latency service can be rapidly transmitted. The RNTI is used for indication, so that load of the downlink control information is not increased, thereby improving transmission performance of the downlink control information.

Figure 10:
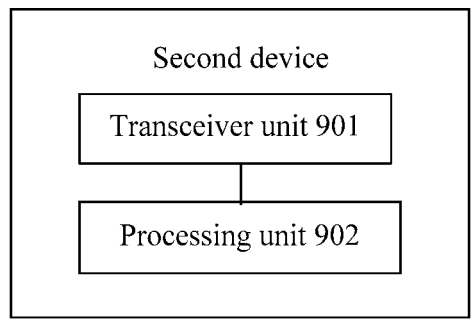
FIG. 10 is a schematic structural diagram of an information transmission apparatus according to another embodiment of the present disclosure.

Referring to FIG. 10, an embodiment of the present disclosure provides an apparatus, configured to implement the information transmission method provided in the foregoing embodiment. The apparatus may be a second device, and may include:

a transceiver unit 901, configured to: receive downlink control information sent by a first device, and send uplink information to the first device; and a processing unit 902, configured to generate the uplink information according to the downlink control information, where the downlink control information includes subframe aggregation information, and the subframe aggregation information is used to indicate a quantity of subframes used in subframe aggregation and/or a redundancy version corresponding to at least one of subframes used in subframe aggregation.

For a description of the subframe aggregation information, refer to the foregoing embodiment. Details are not described herein again.

The quantity of the subframes used in the subframe aggregation and/or the redundancy version corresponding to the at least one of the subframes used in the subframe aggregation is determined according to the subframe aggregation information.

The second device decodes, according to the determined quantity of the subframes used in the subframe aggregation and/or the determined redundancy version corresponding to the at least one of the subframes used in the subframe aggregation, downlink data transmission scheduled by using the downlink control information.

The second device determines, according to a result of the decoding of the downlink data transmission scheduled by using the downlink control information, a hybrid automatic repeat request-acknowledgment corresponding to the downlink data transmission, and sends the determined hybrid automatic repeat request-acknowledgment corresponding to the downlink data transmission.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and/or the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

Specifically, the second device is applicable to an evolved TDD system, for example, a TDD-U system. The transceiver unit 901 may be specifically configured to receive the downlink control information sent by the first device, where the downlink control information includes the subframe aggregation information.

For a description of the subframe aggregation information, refer to the foregoing embodiment. Details are not described herein again.

The processing unit 902 is specifically configured to generate the uplink information according to the downlink control information received by the transceiver unit 901.

The transceiver unit 901 is specifically configured to send the uplink information.

In this step, the uplink information may be a hybrid automatic repeat request-acknowledgment corresponding to the downlink data transmission.

Further, the processing unit 902 is further configured to: determine, according to the subframe aggregation information, the quantity of the subframes used in the subframe aggregation, the redundancy version corresponding to the at least one of the subframes used in the subframe aggregation, and subframe types of the subframes used in the subframe aggregation;

decode, according to the determined quantity of the subframes used in the subframe aggregation, the determined redundancy version corresponding to the at least one of the subframes used in the subframe aggregation, and the determined subframe types of the subframes used in the subframe aggregation, the downlink data transmission scheduled by using the downlink control information; and determine, according to a result of the decoding of the downlink data transmission scheduled by using the downlink control information, a hybrid automatic repeat request-acknowledgment corresponding to the downlink data transmission, and send the determined hybrid automatic repeat request-acknowledgment corresponding to the downlink data transmission.

Further, the processing unit 902 is further configured to: determine, according to hybrid automatic repeat request-acknowledgment subframe information in the downlink control information, a subframe of the hybrid automatic repeat request-acknowledgment corresponding to the downlink data transmission scheduled by using the downlink control information; and send, in the determined subframe of the hybrid automatic repeat request-acknowledgment, the hybrid automatic repeat request-acknowledgment corresponding to the downlink data transmission scheduled by using the downlink control information.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation, and/or the redundancy version corresponding to the at least one of the subframes used in the subframe aggregation, and/or the subframe types of the subframes used in the subframe aggregation, and perform corresponding processing. In this way, the quantity of the subframes used in the subframe aggregation and the redundancy versions of the subframes used in the subframe aggregation are dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S1 can be flexibly configured according to an actual situation, and system performance is improved by using the S1 subframes while GP overheads are proper.

Specifically, the second device is applied to the foregoing communications system, for example, applicable to an LTE system and an LTE-Advanced system. The transceiver unit 901 may be specifically configured to receive the downlink control information sent by the first device, where the downlink control information includes the subframe aggregation information.

For a description of the subframe aggregation information, refer to the foregoing embodiment. Details are not described herein again.

Further, optionally, the transceiver unit 901 is further configured to receive radio resource control signaling sent by the first device. The second device determines, according to the radio resource control signaling, the quantity of the subframes used in the subframe aggregation.

Alternatively, further, optionally, the transceiver unit 901 is further configured to determine, according to a radio network temporary identifier RNTI used to scramble a cyclic redundancy check CRC of the downlink control information, the quantity of the subframes used in the subframe aggregation, where different RNTIs correspond to different subframe quantities.

Further, optionally, the transceiver unit 901 is further configured to determine, according to the radio network temporary identifier RNTI used to scramble the cyclic redundancy check CRC of the downlink control information, a transmission time interval TTI length corresponding to a physical downlink shared channel scheduled by using the downlink control information, where different RNTIs correspond to different TTI lengths.

Alternatively, further, optionally, the transceiver unit 901 is further configured to determine, according to the radio network temporary identifier (RNTI) used to scramble the cyclic redundancy check (CRC) of the downlink control information, a hybrid automatic repeat request-acknowledgment timing corresponding to a physical downlink shared channel scheduled by using the downlink control information, where different RNTIs correspond to different hybrid automatic repeat request-acknowledgment timings.

The quantity of the subframes used in the subframe aggregation is indicated by using the RRC signaling or the RNTI, thereby reducing load of the downlink control information, and improving transmission reliability of the downlink control information.

The processing unit 902 is specifically configured to generate the uplink information according to the downlink control information received by the transceiver unit 901.

The transceiver unit 901 is specifically configured to send the uplink information.

The uplink information may be a hybrid automatic repeat request-acknowledgment corresponding to the downlink data transmission.

Further, the processing unit 902 is further configured to determine, based on the quantity of the subframes used in the subframe aggregation and a redundancy version corresponding to a first subframe in the subframes used in the subframe aggregation, redundancy versions corresponding to remaining subframes in the subframes used in the subframe aggregation, specifically including:

the processing unit 902 is further configured to: use, as a starting point, the redundancy version corresponding to the first subframe in the subframes used in the subframe aggregation, and obtain X redundancy versions in a sequential order of redundancy versions 0, 2, 3, and 1 in a cyclic repetition manner, where X is equal to the quantity of the subframes used in the subframe aggregation, and the X redundancy versions are in a one-to-one correspondence to the subframes used in the subframe aggregation. For example, when the quantity of the subframes used in the subframe aggregation is four, and the redundancy version corresponding to the first subframe is 3, redundancy versions of the four subframes used in the subframe aggregation are sequentially 3, 1, 0, and 2.

Further, the processing unit 902 is further configured to decode, according to the determined quantity of the subframes used in the subframe aggregation and the determined redundancy versions of the subframes used in the subframe aggregation, the downlink data transmission scheduled by using the downlink control information.

The processing unit 902 is further configured to: determine, according to a result of the decoding of the downlink data transmission scheduled by using the downlink control information, a hybrid automatic repeat request-acknowledgment corresponding to the downlink data transmission, and send the determined hybrid automatic repeat request-acknowledgment corresponding to the downlink data transmission.

According to the apparatus provided in this embodiment of the present disclosure, the first device sends the downlink control information to the second device, where the downlink control information includes the subframe aggregation information, so that the second device can obtain, according to the subframe aggregation information, the redundancy version corresponding to the at least one of the subframes used in the subframe aggregation. The first device sends the RRC signaling to the second device, to indicate the quantity of the subframes used in the subframe aggregation, so that the second device obtains the quantity of the subframes used in the subframe aggregation, and performs corresponding processing. In this way, a service delay is reduced while data transmission reliability is ensured.

Specifically, the second device is applied to the foregoing communications system, for example, applicable to an LTE system and an LTE-Advanced system. The transceiver unit 901 may be specifically configured to receive the downlink control information sent by the first device, where the downlink control information includes the subframe aggregation information.

For a description of the subframe aggregation information, refer to the foregoing embodiment. Details are not described herein again.

The processing unit 902 is specifically configured to generate the uplink information according to the downlink control information received by the transceiver unit 901.

The transceiver unit 901 is specifically configured to send the uplink information.

The downlink control information is used to schedule uplink data transmission, and the uplink information is uplink data scheduled by using the uplink control information.

Further, the processing unit 902 is further configured to: determine, according to the subframe aggregation information, the quantity of the subframes used in the subframe aggregation and/or the redundancy version corresponding to the at least one of the subframes used in the subframe aggregation; encode, according to the determined quantity of the subframes used in the subframe aggregation and/or the determined redundancy version corresponding to the at least one of the subframes used in the subframe aggregation, the uplink data transmission scheduled by using the downlink control information; and send the uplink data.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and/or the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service.

Specifically, the second device is applicable to an evolved TDD system, for example, a TDD-U system. The transceiver unit 901 may be specifically configured to receive the downlink control information sent by the first device, where the downlink control information includes the subframe aggregation information.

For a description of the subframe aggregation information, refer to the foregoing embodiment. Details are not described herein again.

The processing unit 902 is specifically configured to generate the uplink information according to the downlink control information received by the transceiver unit 901.

The transceiver unit 901 is specifically configured to send the uplink information.

The downlink control information is used to schedule uplink data transmission, and the uplink information is uplink data scheduled by using the uplink control information.

Further, the processing unit 902 is specifically configured to: determine, according to the subframe aggregation information, the quantity of the subframes used in the subframe aggregation, the redundancy version corresponding to the at least one of the subframes used in the subframe aggregation, and the subframe types of the subframes used in the subframe aggregation; encode, according to the determined quantity of the subframes used in the subframe aggregation, the determined redundancy version corresponding to the at least one of the subframes used in the subframe aggregation, and the determined subframe types of the subframes used in the subframe aggregation, the uplink data transmission scheduled by using the downlink control information; and send the uplink data scheduled by using the downlink control information.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation, and/or the redundancy version corresponding to the at least one of the subframes used in the subframe aggregation, and/or the subframe types of the subframes used in the subframe aggregation, and perform corresponding processing. In this way, the quantity of the subframes used in the subframe aggregation and the redundancy versions of the subframes used in the subframe aggregation are dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, the subframe aggregation information may be further used to indicate the subframe types of the subframes used in the subframe aggregation, so that locations and quantities of subframes S1 can be flexibly configured according to an actual situation, and system performance is improved by using the S1 subframes while GP overheads are proper.

Specifically, the second device is applied to the foregoing communications system, for example, applicable to an LTE system and an LTE-Advanced system. The transceiver unit 901 may be specifically configured to receive the downlink control information sent by the first device, where the downlink control information includes the subframe aggregation information.

For a description of the subframe aggregation information, refer to the foregoing embodiment. Details are not described herein again.

The processing unit 902 is specifically configured to generate the uplink information according to the downlink control information received by the transceiver unit 901.

The transceiver unit 901 is specifically configured to send the uplink information.

The uplink information may be a hybrid automatic repeat request-acknowledgment corresponding to the downlink data transmission.

Further, the processing unit 902 may be specifically configured to: determine, according to the subframe aggregation information, the quantity of the subframes used in the subframe aggregation; decode, according to the determined quantity of the subframes used in the subframe aggregation, the downlink data transmission scheduled by using the downlink control information; and determine, according to a result of the decoding of the downlink data transmission scheduled by using the downlink control information, a hybrid automatic repeat request-acknowledgment corresponding to the downlink data transmission, and send the determined hybrid automatic repeat request-acknowledgment corresponding to the downlink data transmission.

The downlink control information may be alternatively used to schedule uplink data transmission, and the uplink information is uplink data scheduled by using the uplink control information.

Further, the processing unit 902 may be specifically configured to: determine, according to the subframe aggregation information, the quantity of the subframes used in the subframe aggregation; encode, according to the determined quantity of the subframes used in the subframe aggregation, the uplink data transmission scheduled by using the downlink control information; and send the uplink data scheduled by using the downlink control information.

According to the apparatus provided in this embodiment of the present disclosure, the first device sends the downlink control information to the second device, where the downlink control information includes the subframe aggregation information, so that the second device can obtain, according to the subframe aggregation information, the quantity of the subframes used in the subframe aggregation and/or the redundancy version corresponding to the at least one of the subframes used in the subframe aggregation, and perform corresponding processing. In this way, the quantity of the subframes used in the subframe aggregation is dynamically indicated based on a channel condition, so that resources can be efficiently used, spectrum utilization can be improved, and data transmission reliability can be ensured. For example, it is indicated, to a user whose channel condition is favorable, that the quantity of the subframes used in the subframe aggregation is one, and it is indicated, to a user whose channel condition is poor, that the quantity of the subframes used in the subframe aggregation is four. Moreover, in this embodiment, use of consecutive subframes for transmission can reduce a service delay while ensuring transmission reliability. For a user whose channel condition is favorable, use of fewer subframes for transmission can further reduce the service delay. This method can better serve a low-latency and highly-reliable service. Moreover, in this embodiment of the present disclosure, only the last subframe in the subframes used in the subframe aggregation is set to a subframe S1 or a subframe S2, thereby reducing GP overheads while ensuring system performance. Moreover, in this embodiment of the present disclosure, a plurality of subframes send a same redundancy version of a same transport block, so that data coverage can be increased.

Specifically, the second device is applied to the foregoing communications system, for example, applicable to an LTE system and an LTE-Advanced system. The transceiver unit 901 may be specifically configured to receive the downlink control information sent by the first device, where the downlink control information includes the subframe aggregation information.

The processing unit 902 may be further configured to determine, according to the radio network temporary identifier (RNTI) used to scramble the cyclic redundancy check (CRC) of the downlink control information, a transmission time interval (TTI) length corresponding to a physical downlink shared channel scheduled by using the downlink control information, where different RNTIs correspond to different TTI lengths.

Alternatively, the processing unit 902 may be further configured to determine, according to the radio network temporary identifier (RNTI) used to scramble the cyclic redundancy check (CRC) of the downlink control information, a hybrid automatic repeat request-acknowledgment timing corresponding to a physical downlink shared channel scheduled by using the downlink control information, where different RNTIs correspond to different hybrid automatic repeat request-acknowledgment timings.

The processing unit 902 is specifically configured to generate the uplink information according to the downlink control information received by the transceiver unit 901.

The transceiver unit 901 is specifically configured to send the uplink information.

The uplink information may be a hybrid automatic repeat request-acknowledgment corresponding to the downlink data transmission.

Further, the processing unit 902 may be specifically configured to: decode, according to the determined TTI length, the downlink data transmission scheduled by using the downlink control information; and determine, according to a result of the decoding of the downlink data transmission scheduled by using the downlink control information, a hybrid automatic repeat request-acknowledgment corresponding to the downlink data transmission, and send the determined hybrid automatic repeat request-acknowledgment corresponding to the downlink data transmission.

The uplink information may be a hybrid automatic repeat request-acknowledgment corresponding to the downlink data transmission.

Further, the processing unit 902 may be specifically configured to: determine, according to the determined HARQ timing, a subframe of the HARQ-ACK corresponding to the downlink data transmission scheduled by using the downlink control information, and send the HARQ-ACK.

The downlink control information may be alternatively used to schedule uplink data transmission, and the uplink information is uplink data scheduled by using the uplink control information.

Further, the processing unit 902 may be specifically configured to: encode, according to the determined TTI length, the uplink data transmission scheduled by using the downlink control information; and send the uplink data scheduled by using the downlink control information.

According to the apparatus provided in this embodiment of the present disclosure, the first device sends the downlink control information to the second device, to indicate, by using the RNTI of the downlink control information, the hybrid automatic repeat request-acknowledgment timing corresponding to the physical downlink shared channel scheduled by using the downlink control information, so that different HARQ timings are dynamically indicated, and a short HARQ timing may be indicated for a low-latency service, thereby reducing a service delay; or a corresponding HARQ timing is indicated based on a UE capability, thereby enabling a system to use a short HARQ timing as much as possible, and improving system performance. The RNTI is used for indication, so that load of the downlink control information is not increased, thereby improving transmission performance of the downlink control information. Alternatively, in the method provided in this embodiment of the present disclosure, the first device sends the downlink control information to the second device, to indicate, by using the RNTI of the downlink control information, the transmission time interval TTI length corresponding to the physical downlink shared channel scheduled by using the downlink control information. In this way, the TTI length is dynamically indicated, to perform dynamic scheduling and indication according to a service requirement, so that a low-latency service can be rapidly transmitted. The RNTI is used for indication, so that load of the downlink control information is not increased, thereby improving transmission performance of the downlink control information.

It should be noted that in the embodiments provided in the present disclosure, the first device may be a base station, and the transceiver unit 801 may be implemented by a transceiver, such as a transmitter or an information sending interface. The processing unit 802 may be a separately disposed processor, configured to control the transceiver unit 801 to send data and receive data. The separately disposed processor may be alternatively integrated in a processor of the first device for implementation. In addition, a function of the processing unit 802 may be stored in a memory of the first device in a form of program code, and a processor of the first device invokes and performs the function of the processing unit 802.

In the embodiments provided in the present disclosure, the second device may be user equipment, and the transceiver unit 901 may be implemented by a transceiver, such as a transmitter or an information sending interface. The processing unit 902 may be a separately disposed processor, configured to control the transceiver unit 901 to send data and receive data. The separately disposed processor may be alternatively integrated in a processor of the second device for implementation. In addition, a function of the processing unit 902 may be stored in a memory of the second device in a form of program code, and a processor of the second device invokes and performs the function of the processing unit 902.

The processor herein may be a central processing unit (: central processing unit, CPU) or an application-specific integrated circuit (: application specific integrated circuit, ASIC), or may be one or more integrated circuits configured to implement this embodiment of the present disclosure.

Figure 11:
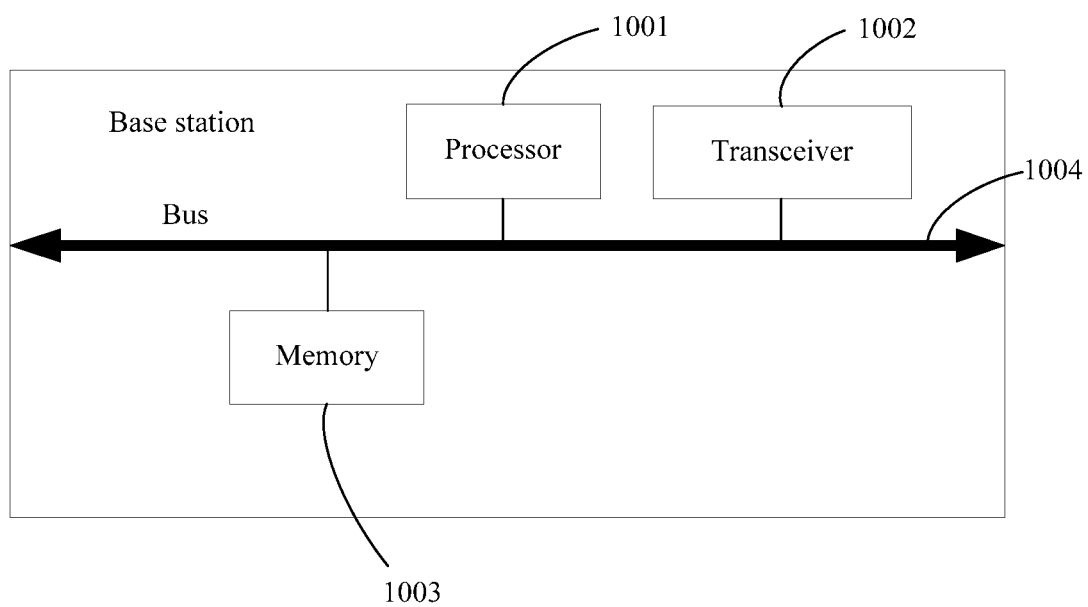
FIG. 11 is a schematic structural diagram of a base station according to an embodiment of the present disclosure.

Referring to FIG. 11, an embodiment of the present disclosure provides an apparatus, configured to implement the foregoing information transmission method. The apparatus may be a base station, and may include: a processor 1001, a transceiver 1002, a memory 1003, and a bus 1004. The processor 1001, the transceiver 1002, and the memory 1003 are connected to and communicate with each other by using the bus 1004.

It should be noted that the processor 1001 herein may be one processor, or may be a general term of a plurality of processing elements. For example, the processor may be a central processing unit CPU, may be an application-specific integrated circuit ASIC, or may be one or more integrated circuits configured to implement this embodiment of the present disclosure, for example, one or more microprocessors (DSP), or one or more field programmable gate arrays (FPGA).

The memory 1003 may be one storage apparatus, or may be a general term of a plurality of storage elements, and is configured to store executable program code, or parameters, data, and the like required for running of an access network management device. In addition, the memory 1004 may include a random access memory (RAM), or may include a non-volatile random access memory (NVRAM), such as a magnetic disk storage or a flash (Flash).

The bus 1004 may be an industry standard architecture (ISA) bus, a peripheral component interconnect (PCI) bus, an extended industry standard architecture (EISA) bus, or the like. The bus 1004 may be classified into an address bus, a data bus, a control bus, and the like. For ease of representation, the bus in FIG. 11 is represented by using only one bold line, but this does not indicate that there is only one bus or only one type of bus.

The processor 1001 is configured to execute a program stored in the memory, to perform, in cooperation with the transceiver 1002, the method provided in the foregoing method embodiment.

Specifically, the processor 1001 may be configured to execute the program stored in the memory, to control the transceiver 1002 to perform a function of the transceiver unit of the base station in the foregoing embodiment. The transceiver 1002 is configured to perform the function of the transceiver unit of the base station in the foregoing embodiment.

Figure 12:
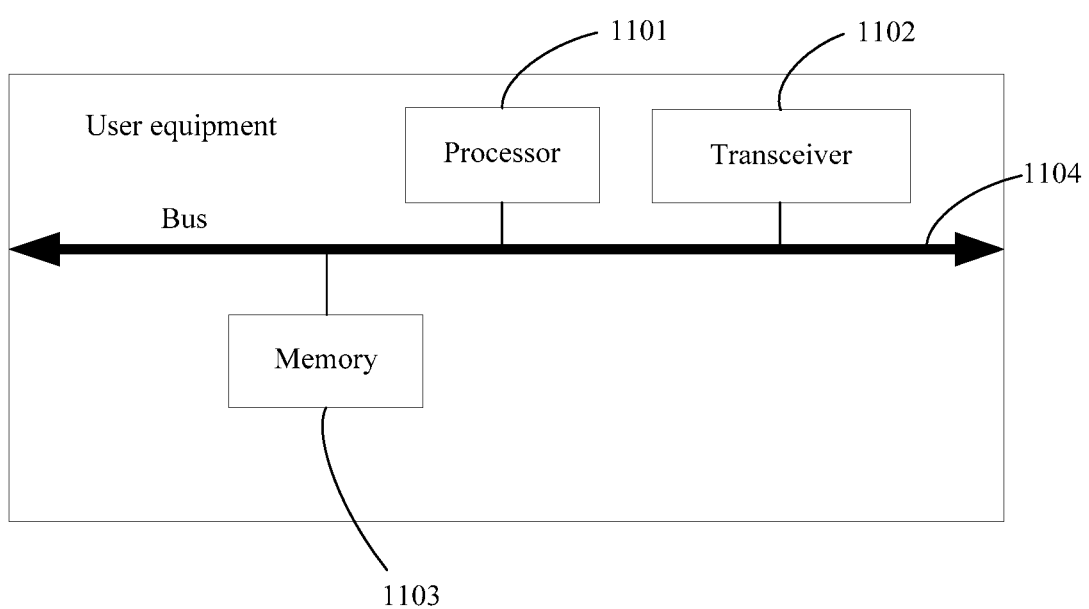
FIG. 12 is a schematic structural diagram of user equipment according to an embodiment of the present disclosure.

Referring to FIG. 12, an embodiment of the present disclosure provides an apparatus, configured to implement the foregoing information transmission method. The apparatus may be user equipment, and may include: a processor 1101, a transceiver 1102, a memory 1103, and a bus 1104. The processor 1101, the transceiver 1102, and the memory 1103 are connected to and communicate with each other by using the bus 1104.

It should be noted that the processor 1101 herein may be one processor, or may be a general term of a plurality of processing elements. For example, the processor may be a central processing unit CPU, may be an application-specific integrated circuit ASIC, or may be one or more integrated circuits configured to implement this embodiment of the present disclosure, for example, one or more microprocessors (DSP), or one or more field programmable gate arrays (field FPGA).

The memory 1103 may be one storage apparatus, or may be a general term of a plurality of storage elements, and is configured to store executable program code, or parameters, data, and the like required for running of an access network management device. In addition, the memory 1103 may include a random access memory (RAM), or may include a non-volatile memory (NVRAM), such as a magnetic disk storage or a flash (Flash).

The bus 1104 may be an industry standard architecture (ISA) bus, a peripheral component interconnect (PCI) bus, an extended industry standard architecture (EISA) bus, or the like. The bus 1104 may be classified into an address bus, a data bus, a control bus, and the like. For ease of representation, the bus in FIG. 12 is represented by using only one bold line, but this does not indicate that there is only one bus or only one type of bus.

The processor 1101 is configured to execute a program stored in the memory, to perform, in cooperation with the transceiver 1102, the method provided in the foregoing method embodiment.

Specifically, the processor 1101 may be configured to execute the program stored in the memory, to control the transceiver 1102 to perform a function of the transceiver unit of the user equipment in the foregoing embodiment.

The transceiver 1102 is configured to perform the function of the transceiver unit of the user equipment in the foregoing embodiment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information transmission method, comprising:
sending, by a first device, downlink control information to a second device, wherein the downlink control information comprises subframe aggregation information, and the subframe aggregation information indicates, to the second device, a quantity of subframes used in subframe aggregation and a redundancy version corresponding to at least one of subframes used in subframe aggregation;
sending, by the first device, different redundancy versions of a transport block using the subframes in the subframe aggregation, wherein the subframe aggregation information corresponds to a redundancy version in the downlink control information, and the subframe aggregation information indicates a redundancy version corresponding to a first subframe in the subframes used in the subframe aggregation;
receiving, by the first device, uplink information sent by the second device according to the downlink control information;
determining, by the first device, acknowledgement of receipt of the transport block according to the downlink control information,
sending, by the first device, radio resource control signaling to the second device, wherein the radio resource control signaling indicates the quantity of the subframes used in the subframe aggregation; and
determining, by the first device, based on the quantity of the subframes used in the subframe aggregation and the redundancy version corresponding to the first subframe in the subframes used in the subframe aggregation, redundancy versions corresponding to remaining subframes in the subframes used in the subframe aggregation, specifically comprising:
using, as a starting point by the first device, the redundancy version corresponding to the first subframe in the subframes used in the subframe aggregation, and obtaining X redundancy versions in a sequential order of redundancy versions 0, 2, 3, and 1 in a cyclic repetition manner, wherein X is equal to the quantity of the subframes used in the subframe aggregation, and the X redundancy versions are in a one-to-one correspondence to the subframes used in the subframe aggregation.

2. The method according to claim 1, wherein
the downlink control information schedules downlink data transmission, and the uplink information is a hybrid automatic repeat request-acknowledgment corresponding to the downlink data transmission.

3. The method according to claim 1, wherein
the downlink control information schedules uplink data transmission, and the uplink information is uplink data scheduled by using the downlink control information.

4. The method according to claim 1, further comprising:
scrambling, by the first device, a cyclic redundancy check (CRC) of the downlink control information by using a radio network temporary identifier (RNTI), wherein the RNTI indicates the quantity of the subframes used in the subframe aggregation, and different RNTIs correspond to different subframe quantities.

5. An information transmission method, comprising:
receiving, by a second device, downlink control information sent by a first device, wherein the downlink control information comprises subframe aggregation information, and the subframe aggregation information is used to indicate a quantity of subframes used in subframe aggregation and a redundancy version corresponding to at least one of subframes used in subframe aggregation;
receiving, by the second device, different redundancy versions of a transport block using the subframes in the subframe aggregation, wherein the subframe aggregation information corresponds to a redundancy version in the downlink control information, and the subframe aggregation information indicates a redundancy version corresponding to a first subframe in the subframes used in the subframe aggregation;
decoding, by the second device, the transport block according to the downlink control information;
sending, by the second device, uplink information to the first device according to the downlink control information,
receiving, by the second device, radio resource control signaling sent by the first device; and
determining, by the second device according to the radio resource control signaling, the quantity of the subframes used in the subframe aggregation; and
determining, by the second device, based on the quantity of the subframes used in the subframe aggregation and the redundancy version corresponding to the first subframe in the subframes used in the subframe aggregation, redundancy versions corresponding to remaining subframes in the subframes used in the subframe aggregation, specifically comprising:
using, as a starting point by the second device, the redundancy version corresponding to the first subframe in the subframes used in the subframe aggregation, and obtaining X redundancy versions in a sequential order of redundancy versions 0, 2, 3, and 1 in a cyclic repetition manner, wherein X is equal to the quantity of the subframes used in the subframe aggregation, and the X redundancy versions are in a one-to-one correspondence to the subframes used in the subframe aggregation.

6. The method according to claim 5, wherein
the downlink control information schedules downlink data transmission, and the uplink information is a hybrid automatic repeat request-acknowledgment corresponding to the downlink data transmission.

7. The method according to claim 5, wherein
the downlink control information schedules uplink data transmission, and the uplink information is uplink data scheduled by using the downlink control information.

8. The method according to claim 5, further comprising:
determining, by the second device according to a radio network temporary identifier (RNTI) scrambling a cyclic redundancy check (CRC) of the downlink control information, the quantity of the subframes used in the subframe aggregation, wherein different RNTIs correspond to different subframe quantities.

9. An information transmission apparatus, comprising:
a processor, configured to generate downlink control information, wherein the downlink control information comprises subframe aggregation information, and the subframe aggregation information is used by a first device to indicate, to a second device, a quantity of subframes used in subframe aggregation and a redundancy version corresponding to at least one of subframes used in subframe aggregation; and
a transceiver, configured to:
  send the downlink control information to the second device, and receive uplink information sent by the second device according to the downlink control information,
  send different redundancy versions of a transport block using the subframes in the subframe aggregation, wherein the subframe aggregation information corresponds to a redundancy version in the downlink control information, and the subframe aggregation information indicates a redundancy version corresponding to a first subframe in the subframes used in the subframe aggregation; and
  receive uplink information sent by the second device according to the downlink control information,
wherein the processor is further configured to determine acknowledgement of receipt of the transport block according to the downlink control information,
wherein the transceiver is further configured to send radio resource control signaling to the second device, wherein the radio resource control signaling indicates the quantity of the subframes used in the subframe aggregation, and
wherein the processor is further configured to determine, based on the quantity of the subframes used in the subframe aggregation and the redundancy version corresponding to the first subframe in the subframes used in the subframe aggregation, redundancy versions corresponding to remaining subframes in the subframes used in the subframe aggregation, specifically comprising:
using, as a starting point by the first device, the redundancy version corresponding to the first subframe in the subframes used in the subframe aggregation, and obtaining X redundancy versions in a sequential order of redundancy versions 0, 2, 3, and 1 in a cyclic repetition manner, wherein X is equal to the quantity of the subframes used in the subframe aggregation, and the X redundancy versions are in a one-to-one correspondence to the subframes used in the subframe aggregation.

10. The information transmission apparatus according to claim 9, wherein the downlink control information schedules downlink data transmission, and the uplink information is a hybrid automatic repeat request-acknowledgment corresponding to the downlink data transmission.

11. The information transmission apparatus according to claim 9, wherein the downlink control information schedules uplink data transmission, and the uplink information is uplink data scheduled by using the downlink control information.

12. The information transmission apparatus according to claim 9, wherein the processor is further configured to scramble a cyclic redundancy check (CRC) of the downlink control information by using a radio network temporary identifier (RNTI), wherein the RNTI indicates the quantity of the subframes used in the subframe aggregation, and different RNTIs correspond to different subframe quantities.

* * * * *